(12) United States Patent
Fu et al.

(10) Patent No.: US 7,205,994 B2
(45) Date of Patent: Apr. 17, 2007

(54) SYNCHRONIZED TWO-LEVEL GRAPHICS PROCESSING CACHE

(75) Inventors: Chih-Hong Fu, Sunnyvale, CA (US); I-Chung Ling, Saratoga, CA (US); Huai-Shih Hsu, San Jose, CA (US)

(73) Assignee: S3 Graphics Co., Ltd., Grand Caymen (VG)

( * ) Notice: Subject to any disclaimer, the term of this patent is extended or adjusted under 35 U.S.C. 154(b) by 252 days.

(21) Appl. No.: 10/968,346

(22) Filed: Oct. 18, 2004

(65) Prior Publication Data

US 2005/0179693 A1 Aug. 18, 2005

Related U.S. Application Data

(63) Continuation of application No. 09/399,280, filed on Sep. 17, 1999, now Pat. No. 6,825,848.

(51) Int. Cl.
G09G 5/36 (2006.01)
(52) U.S. Cl. ..................................... 345/557
(58) Field of Classification Search ................ 345/557, 345/582, 583, 587, 561, 520; 711/118, 122, 711/128, 132, 136, 140, 119, 125, 207, 120, 711/163, 133, 137, 143, 144
See application file for complete search history.

(56) References Cited

U.S. PATENT DOCUMENTS

| | | | |
|---|---|---|---|
| 4,115,806 A | 9/1978 | Morton | |
| 4,357,656 A | 11/1982 | Saltz et al. | |
| 4,855,934 A | 8/1989 | Robinson | |
| 5,179,370 A | 1/1993 | Sato | |
| 5,377,320 A | 12/1994 | Abi-Ezzi et al. | |
| 5,548,709 A | 8/1996 | Hannah et al. | |
| 5,574,836 A | 11/1996 | Broemmelsiek | |
| 5,801,714 A | 9/1998 | Holt | |
| 5,831,640 A | 11/1998 | Wang et al. | |
| 5,841,872 A | 11/1998 | Colvin, Sr. | |
| 5,945,997 A | 8/1999 | Zhao et al. | |
| 6,549,210 B1 | 4/2003 | Van Hook et al. | |
| 6,825,848 B1 * | 11/2004 | Fu et al. | 345/557 |

\* cited by examiner

*Primary Examiner*—Almis Jankus
(74) *Attorney, Agent, or Firm*—Carr & Ferrell LLP

(57) ABSTRACT

A synchronized two-level cache including a level 1 cache and a level 2 cache is implemented in a graphics processing system. The level 2 cache is further partitioned into a number of slots which are dynamically allocated to texture maps as needed. The reference counter of each of the cache lines in each cache level is tracked so that a cache line is not overwritten with new data prior to transferring old data out to the recipient device. The age status of each cache line is tracked so that the oldest cache line is overwritten first. The use of a synchronized two-level cache system conserves system memory bandwidth and reduces memory latency, thereby improving the graphics processing system's performance.

20 Claims, 15 Drawing Sheets

BLOW UP OF FOUR 8 x 8 CACHE LINES 4 x 4

SYNCHRONIZED TWO-LEVEL GRAPHICS PROCESSING CACHE

This application is a continuation application and claims the priority benefit of U.S. patent application Ser. No. 09/399,280 entitled "Synchronized Two-Level Graphics Processing Cache," filed Sep. 17, 1999 and now U.S. Pat. No. 6,825,848. The disclosure of this commonly owned application is incorporated herein by reference.

BACKGROUND OF THE INVENTION

The present invention relates generally to two-level caches, and more particularly to synchronization of a two-level cache in a graphics processing system.

Graphics processing systems process large amounts of data. This data is often texture data. Textures represent surface qualities of geometric objects, and are used to provide increased realism in 3D graphics. Texture information is often stored in the form of texture maps with the texture map being comprised of texture elements (texels). Texels are used in conjunction with geometric information of an object to determine color and intensity of a pixel displayed on a display device. Often multiple texels from a single texture map are used, or blended, to determine the display characteristics of a pixel. In addition, at times texels from more than one texture map are used to determine the display characteristics of any one pixel. Therefore, color and intensity of a single pixel may be formed through blending multiple texels and these texels may come from more than one texture map.

Texture data is often resident in system memory. System memory, however, is a shared resource. In computer systems having a dedicated bus for graphics processing systems, other devices may attempt to access data used by the graphics processing system. This may increase data access time for the graphics processing system. In computer systems in which graphics processing system shares a common system bus with other devices, the common bus may be in use by other devices when the graphics processing system attempts to make use of system memory. In addition, requests for data from system memory may take excessive amounts of time. Accordingly, accessing system memory is a potential performance bottleneck for graphics processing systems.

A graphics cache dedicated to storing graphics data is sometimes used to enhance accessibility of graphics data by a graphics processing system. The graphics cache is provided graphics data from the system memory prior to a demand by the graphics processing system. The graphics system, therefore, has the graphics data available for use when desired, thereby reducing the need to promptly access system memory and reducing problems associated with memory latency.

A graphics cache, however, is often too small to store an entire texture map. Increasing the size of the graphics cache to allow for storage of an entire texture map is not always a viable solution. Increasing the size of the graphics cache may result in decreased performance as cache access time generally increases with cache size. In addition, increased cache size requires increased space within a chip, and chip space is often at a premium.

In order to provide increased cache size without significantly affecting cache performance, caches for central processing units (CPUs) are sometimes in the form of two-level caches. In a two-level cache a first level cache makes data readily available to a user of the data, such as a graphics engine. A second level cache, generally containing significantly more data, supplies data to the first level cache. The use of a two-level cache provides benefits in terms of increased data availability and decreased memory access time. The use of a two-level cache, however, also creates issues with respect to the transfer of the data to, and the deletion of data from, the cache system.

Beneficially, data most likely to be immediately required for use by the user is present in the level one cache, with data likely to be required for use in the near future in the level two cache. By transferring appropriate portions of the texture map between the two caches, the graphics processing system can have the data available in the graphics cache, resulting in reduced memory access time. Without appropriate determination of which data to transfer, and which data to overwrite, however, the benefits of a two-level cache may be reduced.

SUMMARY OF THE INVENTION

The present invention is a graphics processing system having a synchronized two-level cache.

One embodiment of the present invention is a method of performing graphics processing using a first cache comprised of first cache lines and a second cache comprised of second cache lines. Each of the first cache lines is associated with first cache flags. Each of the second cache lines is associated with second cache flags. An availability of graphics data in the first cache and second caches are checked. Then, first and second cache flags are updated based on availability of the graphics data in the first and second caches.

Another embodiment of the present invention is a method of performing graphics processing where the first cache lines are divided into a plurality of slots and a plurality of first sets. The second cache lines are also divided into a plurality of second sets.

Yet another embodiment of the present invention is a method of performing graphics processing where the first cache flags comprise a plurality of first reference counters and a plurality of first age status stacks. The second cache flags comprise a plurality of second reference counters and a plurality of second age status stacks.

Yet another embodiment of the present invention is a method of performing graphics processing where availability of the graphics data in the first and second caches are ascertained. Texel coordinates are received. First and second tag addresses are ascertained from the texel coordinates. The first tag addresses are compared with first content identities of the first cache lines belonging to the associated one of the plurality of first sets of the associated one of the plurality of slots. Based on the results of the comparisons, a first graphics data available status or a first graphics data not available status is returned. The second tag addresses are compared with second content identities of the second cache lines belonging to the associated one of the plurality of second sets. Based on the results of the comparisons, a second graphics data available status or a second graphics data not available status is returned.

Yet another embodiment of the present invention is a method of performing graphics processing where first cache flags are updated based on availability of the graphics data in the first and second caches. First and second age statuses become youngest when updated based on the availability of the graphics data in the first and second caches. The first and second reference counters are reset or incremented based on the availability of the graphics data in the first and second caches. Oldest first and second cache lines are selected and updated to be youngest depending on the availability of the graphics data in the first and second caches.

Yet another embodiment of the present invention is a graphics processing system comprising a first cache, a second cache, an engine and a frame buffer. The first and second caches contain a plurality of first and second cache lines. The first cache is partitioned into a plurality of slots. The first cache receives data from a system memory. The second cache receives the data from the first cache. The first cache and the second caches are synchronized with each other.

Yet another embodiment of the present invention is a graphics processing system comprising an age status tracking means, first and second reference counters and first and second internal counters. The age status tracking means keep track of a least recently used second cache line and a least recently used first cache line. First and second reference counters keep track of how many times data in the respective first and second cache lines have been requested. The first and second internal counters keep track of how many times requested data in the respective first and second cache lines have been transferred. The least recently used first and second cache lines are selected to be overwritten with data to be received.

Yet another embodiment of the present invention is a graphics processing system comprising a first cache, a second cache, an engine and a frame buffer. The first and second caches contain a plurality of first and second cache lines. The first cache is partitioned into a plurality of slots. The first cache receives texture data from a system memory. The second cache receives the texture data from the first cache. The first cache and the second caches are synchronized with each other.

Yet another embodiment of the present invention is a synchronized two level cache system in a graphics processor generating display information based on graphics data for an area comprising a first cache comprised of first cache lines containing graphics data and a second cache comprised of second cache lines containing graphics data. The first and second cache lines each contain data for contiguous regions of the area.

Many of the attendant features of this invention will be more readily appreciated as the same becomes better understood by reference to the following detailed description considered in connection with the accompanying drawings.

DETAILED DESCRIPTION

Figure 1:
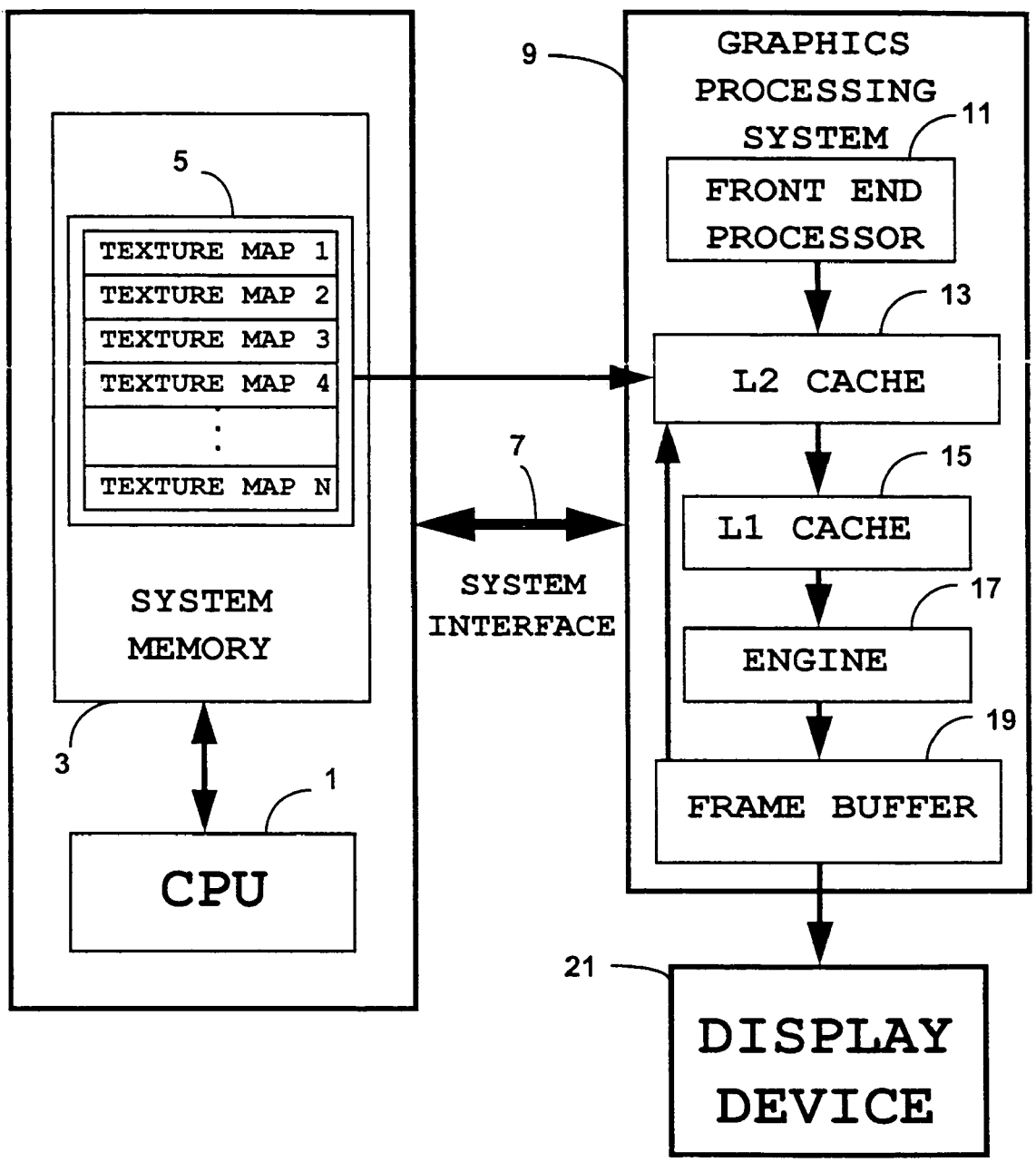
FIG. 1 is a system block diagram of a computer system having a graphics processing system.

FIG. 1 illustrates a simplified block diagram of a computer system. The computer system includes a CPU 1, a system memory 3 and a graphics processing system 9. The CPU 1 performs various functions, including determining information, such as a viewpoint location, allowing for the generation of graphics displays. The system memory 3 stores a variety of data, including graphic display data such as texture maps. The graphics processing system 9, based on information determined by the CPU 1 and data stored in the system memory 3, generates displays for display on a monitor.

The CPU 1 provides requests to the graphics processing system 9 over a system interface 7. These requests include requests to process and display graphics information. Graphics requests from the CPU 1 are received by the graphics processing system 9 and provided to a front end processor 11. The front end processor 11 generates a pixel stream containing pixel coordinates for a display device 21.

Information relating to the pixel coordinates generated by the front end processor 11 is provided to an engine 17. The engine 17 processes the information, often including performing filtering of the information, such as bilinear or trilinear filtering, and generates color data for each pixel. The engine 17 provides the color data to a frame buffer 19, and the frame buffer 19 is used to generate a display on, for example, a monitor or display device 21.

The graphics processing system 9 includes a cache. The cache is a two-level cache, including a level 1 ("L1") cache 15 and a level 2 ("L2") cache 13. The L1 and L2 caches store portions of texture maps used during graphics processing. The texture maps contain texture information for geometric objects. The texture information is stored as individual texture elements (texels). The texels are used during graphics processing to define color data displayed at pixel coordinates. The texture data flows from the system memory to the L2 cache 13, then from the L2 cache 13 to the L2 cache 15.

Figure 2:
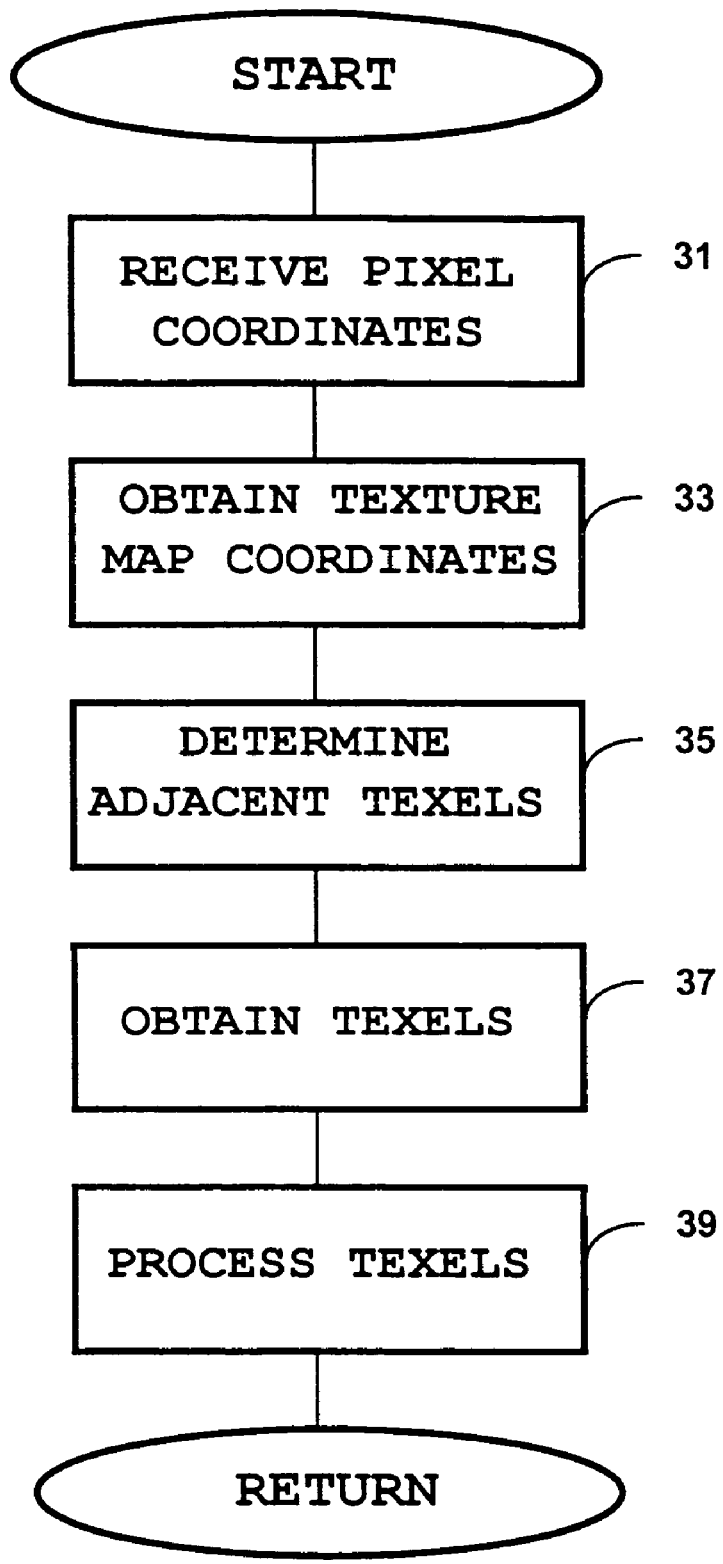
FIG. 2 is a flow diagram of a process for determining pixel data in accordance with one embodiment of the present invention.

FIG. 2 is a flow diagram of a process for determining pixel data in accordance with one embodiment of the present invention. In the embodiment described the process is performed by logic circuitry. Methods of translating the processes described herein into logic circuitry are well known in the art. In step 31, the process receives pixel coordinates for a pixel, $P_0$. Coordinates of the pixel is in terms of X and Y screen coordinates. In step 33 the process determines texture map coordinates corresponding to the pixel coordinates. Corresponding texture map coordinates are in terms of U and V. Methods of relating XY coordinates and UV coordinates are known in the art, and it is sufficient to note that the corresponding texture map coordinates for $P_0$ are $U_0$, $V_0$.

In step 35 the process determines the four adjacent, i.e., closest, texels to $U_0$, $V_0$. More specifically, this is done by determining which of the four closest texels to $U_0$, $V_0$ has the smallest U, V values, and then incrementing the smallest U, V values to determine the other closest texels. Generally the correspondence between pixels and texels is not one-to-one. Thus, the coordinates $U_0$, $V_0$ may lie at a location other than the center of a texel. As coordinates for texels are determined by their centers, and texels are discrete in that their centers are described by integer values, coordinates of the texel with the smallest U and V coordinates among the four adjacent texels to $U_0$, $V_0$ are simply truncated values of $U_0$, $V_0$. In other words, truncating $U_0$, $V_0$ provides $U_0'$, $V_0'$ where $(U_0', V_0')$ is the texel which is the closest to the origin of the texture map among the four adjacent texels. The four adjacent texels to $U_0$, $V_0$, therefore are $(U_0', V_0')$, $(U_0'+1, V_0')$, $(U_0', V_0'+1)$ and $(U_0'+1, V_0'+1)$.

The process then obtains data for the adjacent texels in step 37. In doing so, the process searches the L1 and L2 caches for data for the adjacent texels. If the data is present in the L1 cache or the L2 cache, the process obtains the data from the cache. If the data for the adjacent texels is not present in either the L1 cache or the L2 cache, the texels are loaded from the system memory or the frame buffer. In either event, internal flags relating to the cache are updated based on the presence, or lack of presence, of the data in the cache. In step 39 the process processes the data in the engine. During processing, texels are blended in the engine for generation of pixel color data for pixel $P_0$. The pixel $P_0$ is thereafter displayed on the display device.

Figure 3:
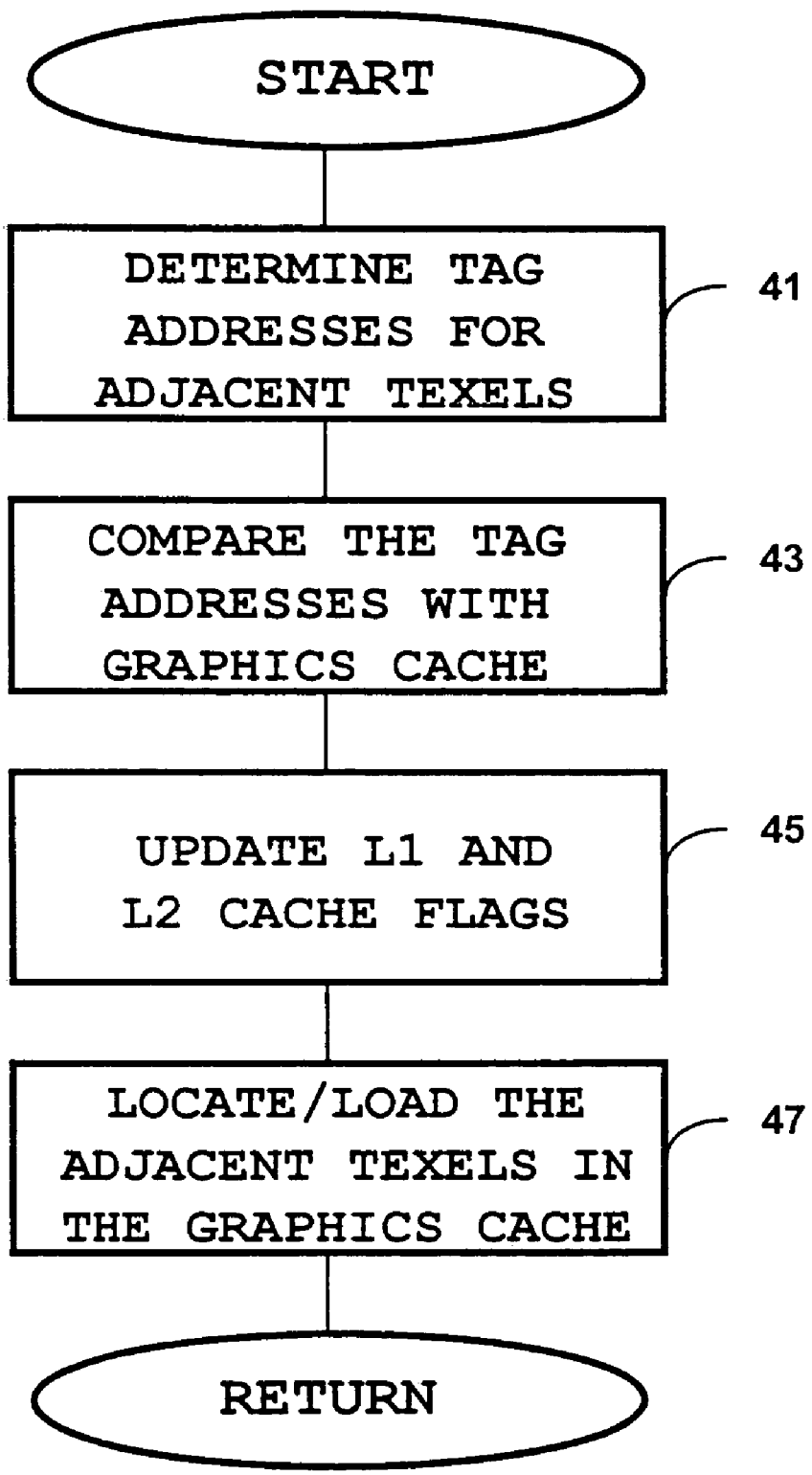
FIG. 3 is a flow diagram of a process for obtaining texel data.

FIG. 3 is a flow diagram showing details of the step of obtaining the desired texture data. As previously mentioned, the process determines if the desired texture data is in the L1 or the L2 cache. The determination as to the presence of the data in the cache is accomplished using tag addresses. Tag addresses identify the locations in terms of texels stored in the cache.

More specifically, tag addresses are used to determine if cache lines which make up the L2 and L1 caches contain the desired texture data. The L2 cache and the L1 cache are comprised of cache lines. Each cache line is of a predefined size, and contains data for a number of texels. Further, the texels in each cache line form a contiguous region of texture map in UV space. In the embodiment described the contiguous region is rectangular in shape. Thus, if the number of bits per texel is known, a single set of UV coordinates of an identified texel contained within the cache line is sufficient to identify a region of UV space covered by the texels in the cache line.

Accordingly, each cache line of the L2 cache is identified by an L2 tag address, and each cache line of the L1 cache is identified by an L1 tag address. The L2 tag addresses are in terms of a depth value D, a V value and a U value. D is a measure of a distance of a 3D object away from a viewer. In the embodiment described, the U and V values are simply the U and V coordinates of an upper left texel in the cache line, with some of the least significant bits stripped off. As the least significant bits indicate the specific location of a texel within a portion of a texture map, stripping off the least significant bits results in a set of UV coordinates pointing to a region in UV space. This region is the area covered by data in an L2 cache line.

Similar to the L2 tag addresses, the L1 tag addresses are also in terms of a depth value D, a V value and a U value. However, in addition to D, U and V values, the L1 tag addresses include an additional term, a Slot ID of the L2 cache. The Slot ID of the L2 cache in the L1 tag address indicates a slot of the L2 cache to which the texture map containing the desired texture data is mapped. This slot ID information is used during pairings between L1 and L2 sets which will be described in detail later with reference to FIG. 13.

An L1 tag address for a texture map portion containing a texel may not be the same as an L2 tag address for a texture map containing the same texel. This is because in one embodiment of the present invention the L1 and L2 caches differ in the number of bits per texel structures. For example, in one embodiment, an L2 cache line contains 256 texels, with 4 bits per texel, while an L1 cache line contains 16 texels, with 32 bits per texel. Thus, texture map portions addressed by multiple L1 tag addresses may be encompassed by a single L2 tag address. Therefore, the tag addresses are defined with respect to each of the L1 and L2 caches.

Thus, each of the texels resides in a texture map portion which is identifiable by a tag address. The tag addresses contain information regarding relative positions of the texture map portions within a texture map. Similarly, each cache line contains data for a contiguous region of UV space. Tag addresses contain information sufficient to determine the location in UV space of each cache line. Accordingly, comparison of the UV address of a specific texel with the tag addresses of the cache lines allows for a determination as to the presence of data for any one texel in the cache.

Thus, in step 41 the process translates the U, V coordinates of the adjacent texels into tag addresses. In step 43 the process compares these tag addresses to tag addresses of the L1 and L2 cache lines. The process in step 45 updates L1 and L2 cache flags based on the results of the comparisons. The cache flags are used to coordinate synchronization between the L1 cache and the L2 cache. The cache flags for both the L1 and L2 caches include reference counters and age statuses. The reference counters indicate the number of transfer requests for a cache line. The age statuses indicate when data in a cache line was last used. As is later discussed, the reference counters and the age statuses are used in selecting portions of the L1 and L2 caches to be used for receiving a data transfer, and when such data transfer is to be made. The process in step 47 locates or loads the adjacent texels. If the comparisons indicate that the adjacent texels reside in the graphics cache, these texels are located. If the adjacent texels do not reside in the L1 cache or the L2 cache, they are loaded into the L1 and L2 caches.

Figure 3B:
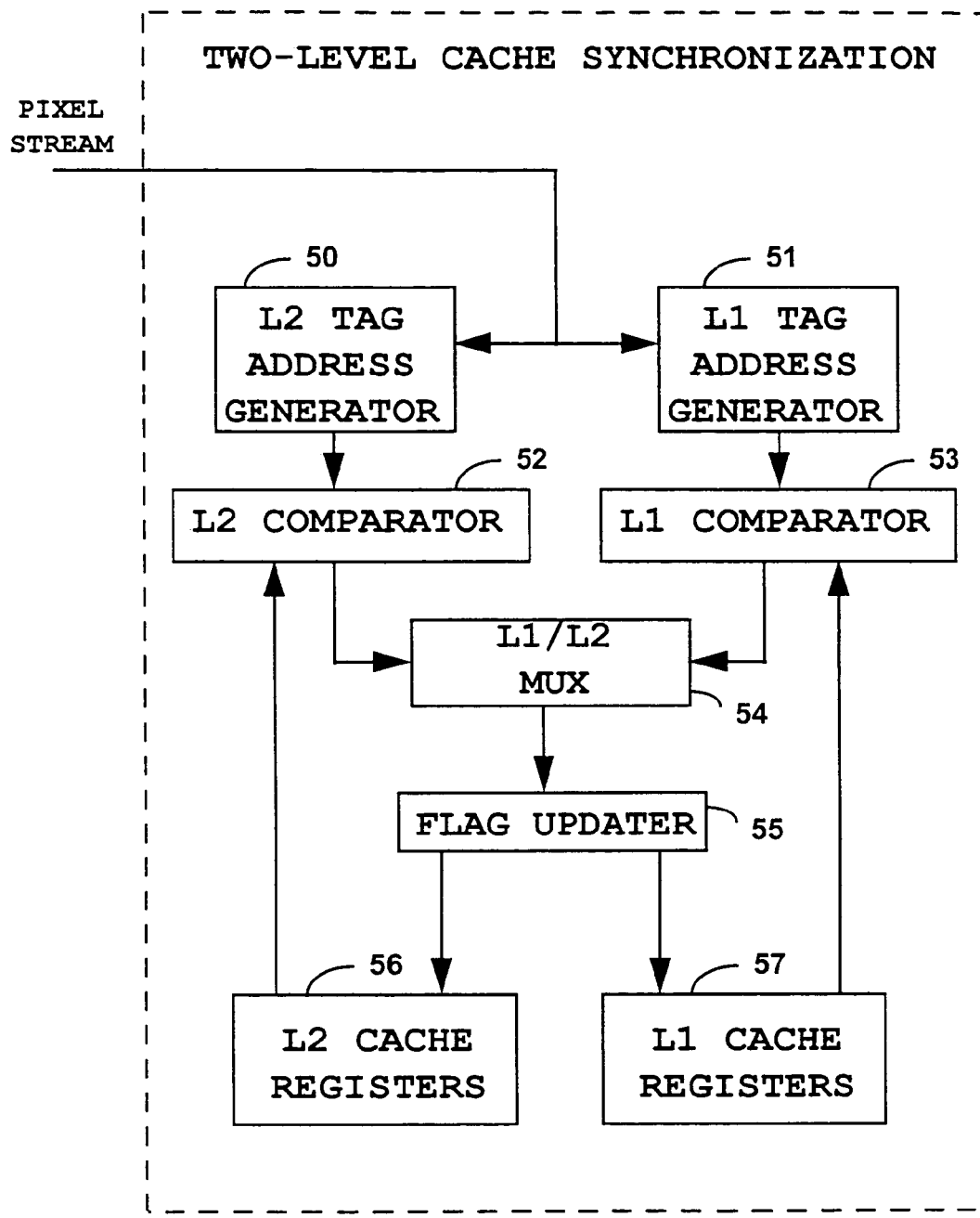
FIG. 3B is a block diagram of a system comprised of logic circuits for performing the process of receiving a pixel stream and updating cache flags.

FIG. 3B illustrates a block diagram of an embodiment of logic circuitry used during a two-level cache synchronization. L1 and L2 tag address generators 51 and 50 receive a pixel stream including pixel coordinates and generate L1 and L2 tag addresses for texels adjacent to $U_0$, $V_0$. The L1 tag addresses are in terms of an L2 slot ID, a depth value D, a U value and a V value as previously described. The L2 tag addresses were also previously described and are in terms of a depth value D, a U value and a V value.

Upon generation of the L1 and L2 tag addresses for the adjacent texels, an L1 comparator 53 compares the L1 tag addresses with tag addresses associated with the L1 cache lines. Similarly, an L2 comparator 52 compares the L2 tag addresses with tag addresses associated with the L2 cache lines. The tag addresses associated with L1 cache lines and L2 cache lines reside, respectively, in L1 cache registers 57 and L2 cache registers 56.

Results of L1 and L2 tag address comparisons are compiled and multiplexed in an L1/L2 multiplexor 54. In the L1/L2 multiplexor, L1 and L2 cache lines are paired based on relationship between them. For example, an L1 cache line is paired with an L2 cache line when both of them are mapped to a region in UV space where one of the adjacent texels is located. A flag updater 55 obtains pairing information as well as the compiled results of the L1 and L2 tag address comparisons and updates L1 and L2 cache flags including the reference counters and the age statuses. The L1 cache flags and the L2 cache flags reside in the L1 cache registers 57 and the L2 cache registers 56, respectively.

Figure 9:
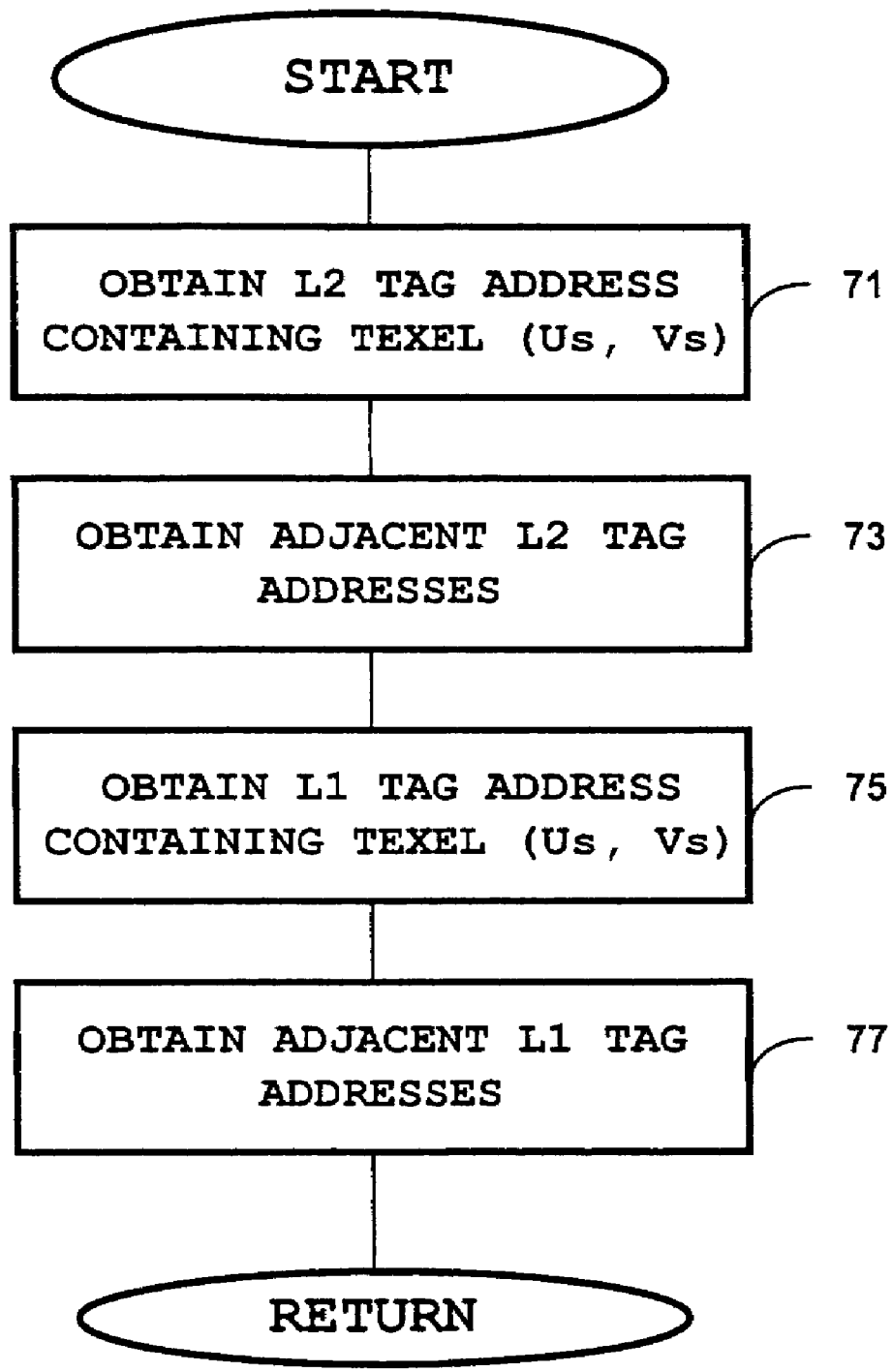
FIG. 9 is a flow diagram of a process for determining tag addresses of adjacent texels.

FIG. 9 is a flow diagram of a process for determining tag addresses for the adjacent texels. The process in step 71 determines an L2 tag address for the texel $(U_0', V_0')$. In step 73 the process determines L2 tag addresses for the three adjacent texels, namely $(U_0'+1, V_0')$, $(U_0', V_0'+1)$ and $(U_0'+1, V_0'+1)$. Similarly, the process in step 75 generates a tag address for the L1 cache for a texture map portion containing the texel $(U_0', V_0')$. In step 77, the process generates L1 tag addresses for three texture map portions which are adjacent to the texture map portion containing the texel $(U_0', V_0')$.

Figure 10:
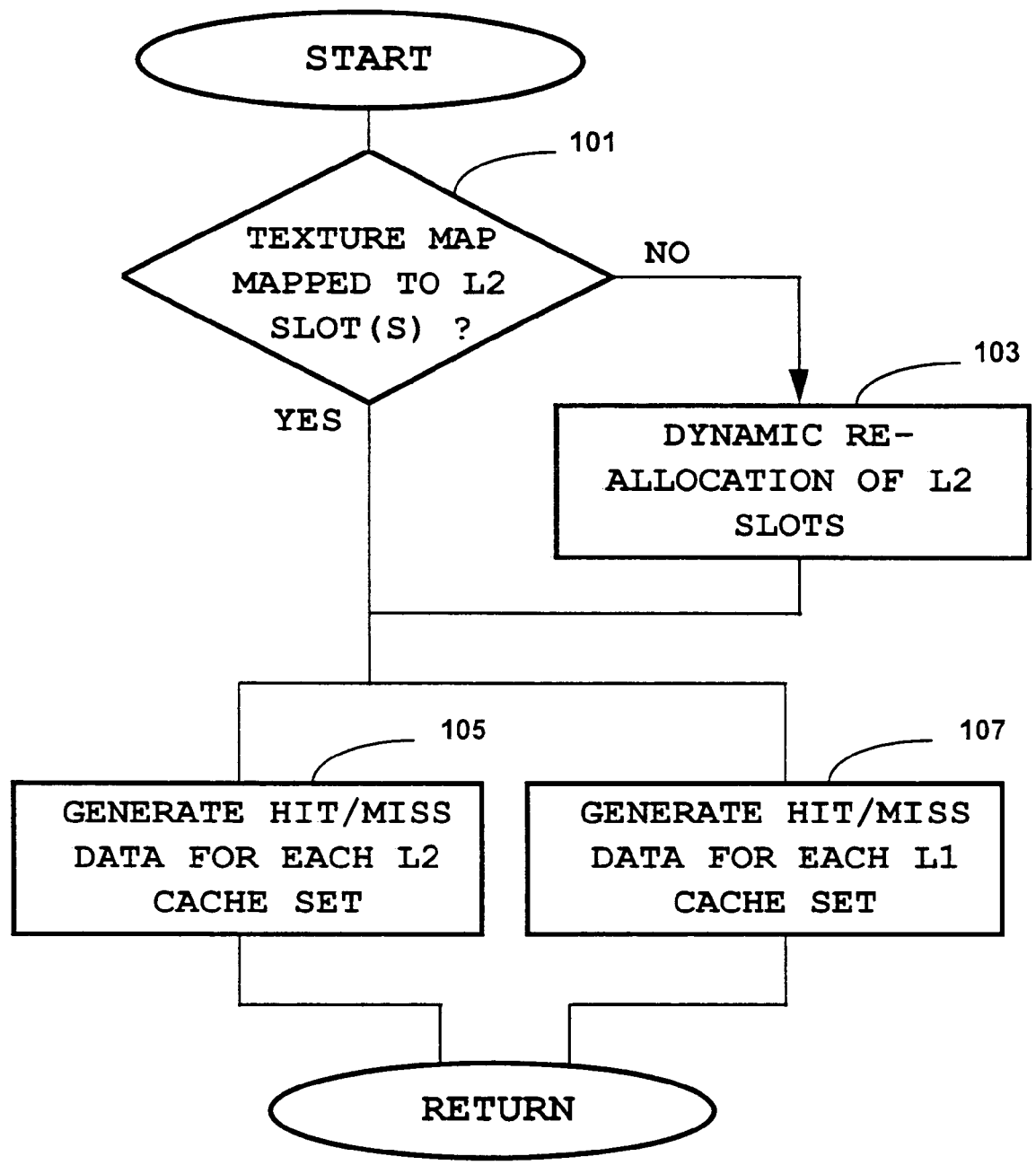
FIG. 10 is a flow diagram of a process for generating hit/miss data for L1 and L2 cache interrogatories.

FIG. 10 is a flow diagram showing details of the step of comparing tag addresses of the texels with tag addresses of the L1 and L2 cache lines. Before comparisons are made between the tag addresses for the adjacent texture map portions and the L2 cache lines, a determination is made as to whether the texture map containing the texels is mapped to any of the slots of the L2 cache.

Figure 4:
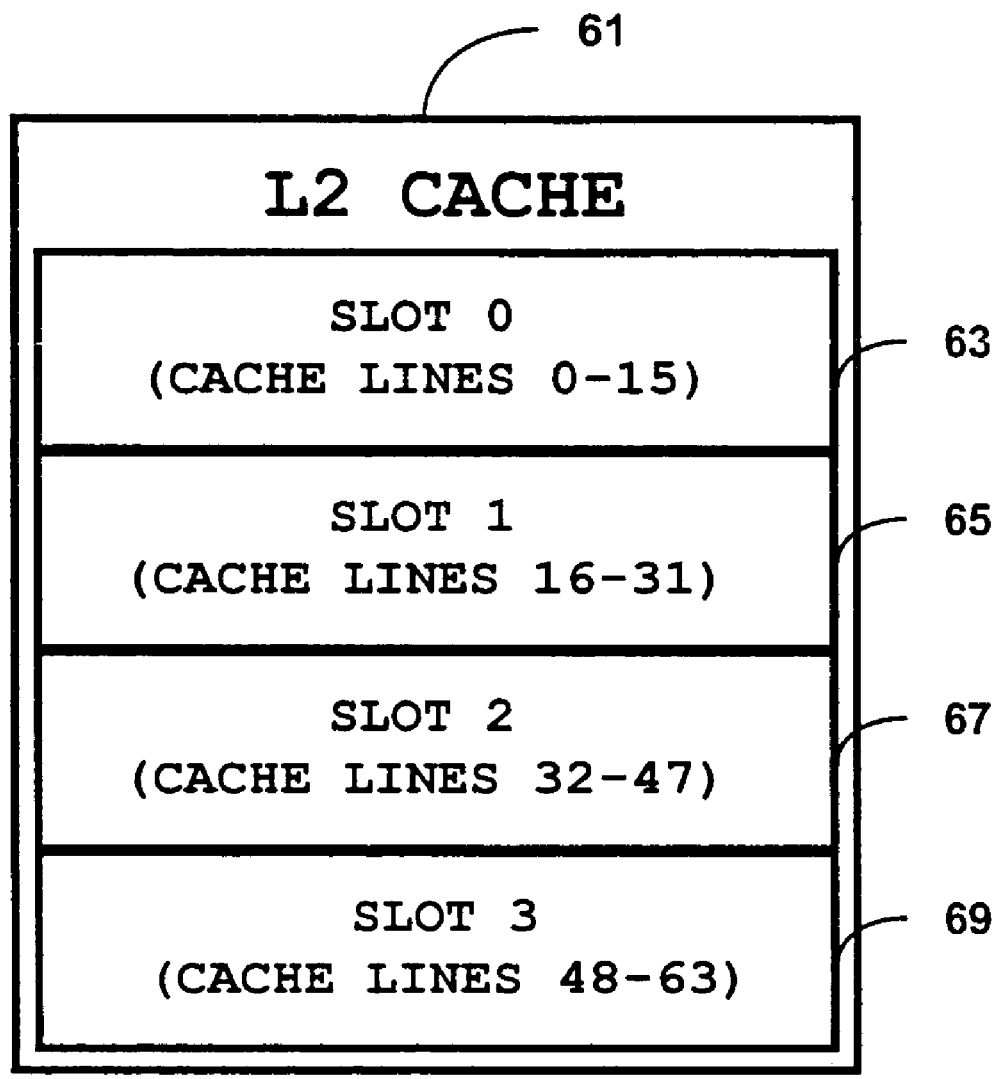
FIG. 4 illustrates an L2 cache configuration in which the L2 cache is partitioned into slots.

An embodiment of an L2 cache having multiple slots is shown in FIG. 4. The L2 cache 61 is partitioned into four slots, a Slot 0 63, a Slot 1 65, a Slot 2 67 and a Slot 3 69. Each of the four slots is further partitioned into 16 cache lines. The L2 cache, therefore, includes 64 cache lines. In the embodiment described, each cache line is 1024 bits, and contains information for 64 texels. Texels are therefore described by 16 bits. In other embodiments the number of bits per texel is different. For example, four bits per texel are used in one embodiment, and in still another embodiment the number of bits per texel varies dynamically according to the level of detail for each texture map.

Accordingly, in step 101 the process determines whether the texture map is mapped to one of the slots of the L2 cache. Information regarding the specific texture maps mapped to the slots of the L2 cache is provided to the graphics processing system by a graphics driver resident in the CPU, and this information is maintained in a register of the graphics processing system. If the texture map has not been mapped to a slot of the L2 cache, comparisons of tag addresses to determine if the texels are in any of the L2 cache lines are unnecessary. Therefore, if the texture map is not allocated to any of the L2 cache slots the process in step 103 dynamically re-allocates slots of the L2 cache to map the texture map to one or more of the slots prior to performing the tag address comparisons.

Alternatively, the dynamic re-allocation of the slots is commanded by the graphics driver. The graphics driver determines which texture maps are needed to render a given scene, and commands the L2 cache to allocate the slots to the needed texture maps. Further details of allocation of texture maps to the L2 cache may be found in the commonly assigned patent application No. 09/399,300 entitled "Dynamic Allocation of Texture Cache Memory," filed on Sep. 17, 1999 and now U.S. Pat. No. 6,750,872, the disclosure of which is incorporated herein by reference.

Once the L2 slots are re-allocated, the tag addresses of the texture map portions corresponding, respectively, to the sets of the L1 cache and the L2 cache are compared to the tag addresses of the cache lines of corresponding sets of the L1 and L2 caches. The process in step 105 compares the tag addresses and generates hit/miss data for each set of the L2 cache. The process in step 107 generates hit/miss data for each set of the L1 cache. During these comparisons, hit/miss data is generated for each of the L1 and L2 sets. The hit/miss data is generated on a set basis. A set is a subdivision of the L1 and L2 caches. To further understand how hit/miss data is generated it is appropriate to discuss further details of the L2 and L1 caches.

Figures 5, 6:
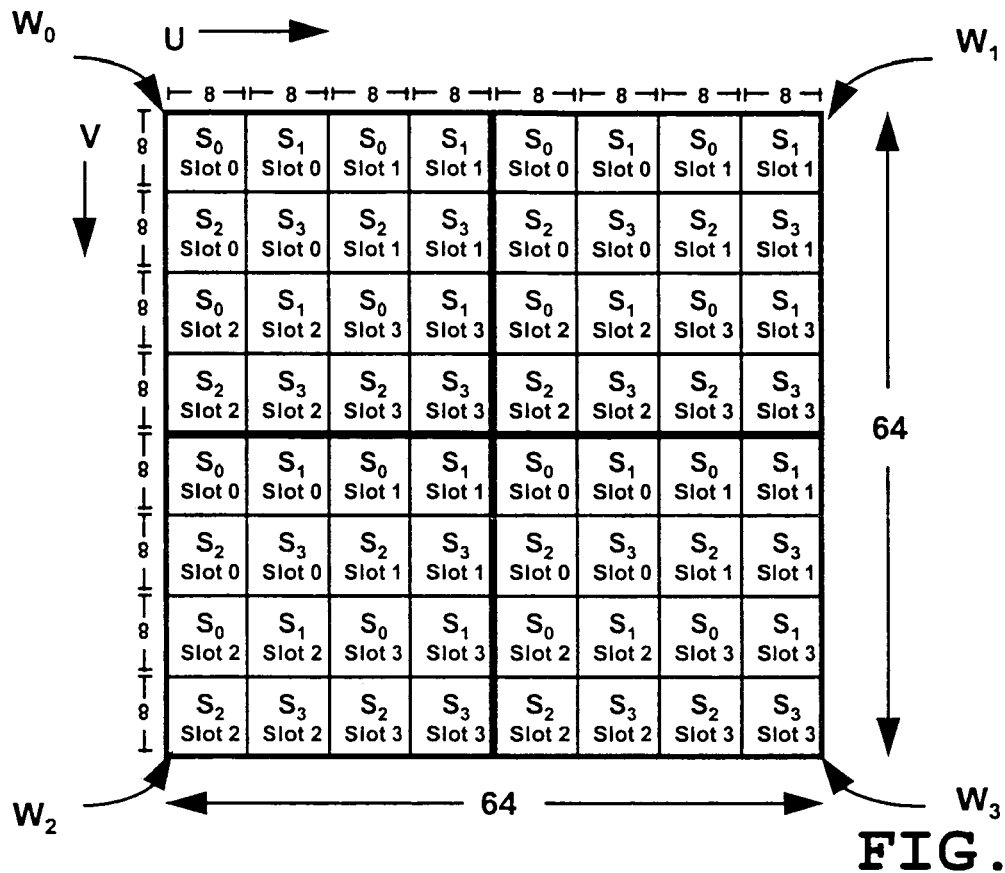
FIG. 5 illustrates further details of the L2 cache of FIG. 4.
FIG. 6 illustrates details of four cache lines of the L2 cache of FIG. 4.

FIG. 5 illustrates further details of the L2 cache of FIG. 4, including details of how texture map data is stored in the L2 cache. FIG. 5 illustrates the 64 cache lines of the L2 cache arranged in a square having horizontal and vertical edges. The actual physical arrangement of the cache lines may not be square, and indeed is unlikely to be so arranged, but the use of a square for descriptive purposes is useful in understanding the arrangement of data in the L2 cache. Generally speaking, the L2 cache contains data for a portion of a texture map, with a horizontal axis of the L2 cache corresponding to the U direction, and a vertical axis of the L2 cache corresponding to the V direction.

Each of the four slots, Slot 0, Slot 1, Slot 2 and Slot 3 of the L2 cache includes four sets $S_0$, $S_1$, $S_2$ and $S_3$. Thus, the cache lines in Slot 0 are subdivided into four sets $S_0$, $S_1$, $S_2$ and $S_3$. The cache lines of each of the other slots are also so divided. In diagram form, therefore, the square illustrated in FIG. 5 is divided into four quadrants. Each quadrant represents a way, which is later discussed, and each quadrant is divided into 16 small squares. Each small square represents an L2 cache line. In each quadrant, four upper left small squares represent cache lines belonging to each of the four sets $S_0$, $S_1$, $S_2$ and $S_3$ of Slot 0, respectively. Similarly, four upper right small squares represent cache lines of Slot 1, four lower left small squares represent cache lines of Slot 2, and four lower right small squares represent cache lines of Slot 3.

The four cache lines in each slot of each quadrant is arranged so that $S_0$ is at an upper left corner, $S_1$ is at an upper right corner, $S_2$ is at a lower left corner and $S_3$ is at a lower right corner. Therefore, the L2 cache lines are organized in such a way that each of any four adjacent L2 cache lines belongs to a different set. When a texture map portion is transferred to the L2 cache, it is loaded into the set of the slot to which it has been mapped based on mapping information contained in L2 tag addresses. Therefore, mapping of a texture map to the L2 cache pre-determines as to which cache line-sized texture map portion will be transferred to which set of the slot.

Thus, when a texture map is mapped to a slot of the L2 cache, each cache-line sized texture map portion is mapped to a set of the slot and not to a particular cache line. Therefore, each cache-line sized texture map portion can be loaded into any of the four cache lines belonging to the set of the slot to which the texture map portion has been mapped. For example, if a texture map portion is mapped to set $S_0$ of Slot 0, the texture map portion may be stored in any of the four cache lines belonging to set $S_0$ of Slot 0.

Since the L2 cache is loaded on a cache line basis when texture data is transferred into the L2 cache, it is possible for two adjacent L2 cache lines to contain two non-contiguous portions of the texture map in UV space where the two non-contiguous texture map portions are mapped to two adjacent sets of the L2 cache. For example, suppose a first cache line-sized portion of a texture map has been mapped to set $S_0$ of Slot 0 and a second cache line-sized portion of the texture map has been mapped to set $S_1$ of Slot 0, where the first cache line-size portion is not contiguous to the second cache line-sized portion in UV space. When the first and second cache line-sized portions are loaded into the L2 cache, they can be loaded into two adjacent cache lines, one belonging to set $S_0$ and the other belonging to set $S_1$.

A corollary is that two cache line-sized portions of a texture map, contiguous to each other in UV space, do not necessarily occupy two adjacent cache lines when loaded into the L2 cache. For example, suppose a first and second cache line-sized portions of a texture map are mapped to set $S_0$ of Slot 0 and set $S_1$ of Slot 0, respectively. Suppose the first cache line-sized portion is loaded into one of four L2 cache lines belonging to set $S_0$ of Slot 0. When the second cache line-sized portion is loaded into the L2 cache, it can be loaded into any of four cache lines belonging to set $S_1$ of Slot 0, only one of which is adjacent to the L2 cache line to which the first cache line-sized portion was loaded.

Therefore, for example, suppose four adjacent cache line-sized portions of a texture map, each containing an adjacent texel, have been mapped to four different sets of a slot in the L2 cache. When the slot of the L2 cache is searched for the four adjacent cache line-sized portions, they may be found in cache lines that are non-adjacent to each other. In addition, some of the cache line-sized portions may be found in the L2 cache while others are not. In other words, since the L2 cache is loaded on a cache line basis, some cache line-sized portions may have been loaded into the L2 cache while others have not been loaded into the L2 cache. In these cases where some cache line-sized portions are found in the L2 cache and others are not, the cache line-sized portions that are not found in the L2 cache are loaded into the L2 cache.

Figure 11:
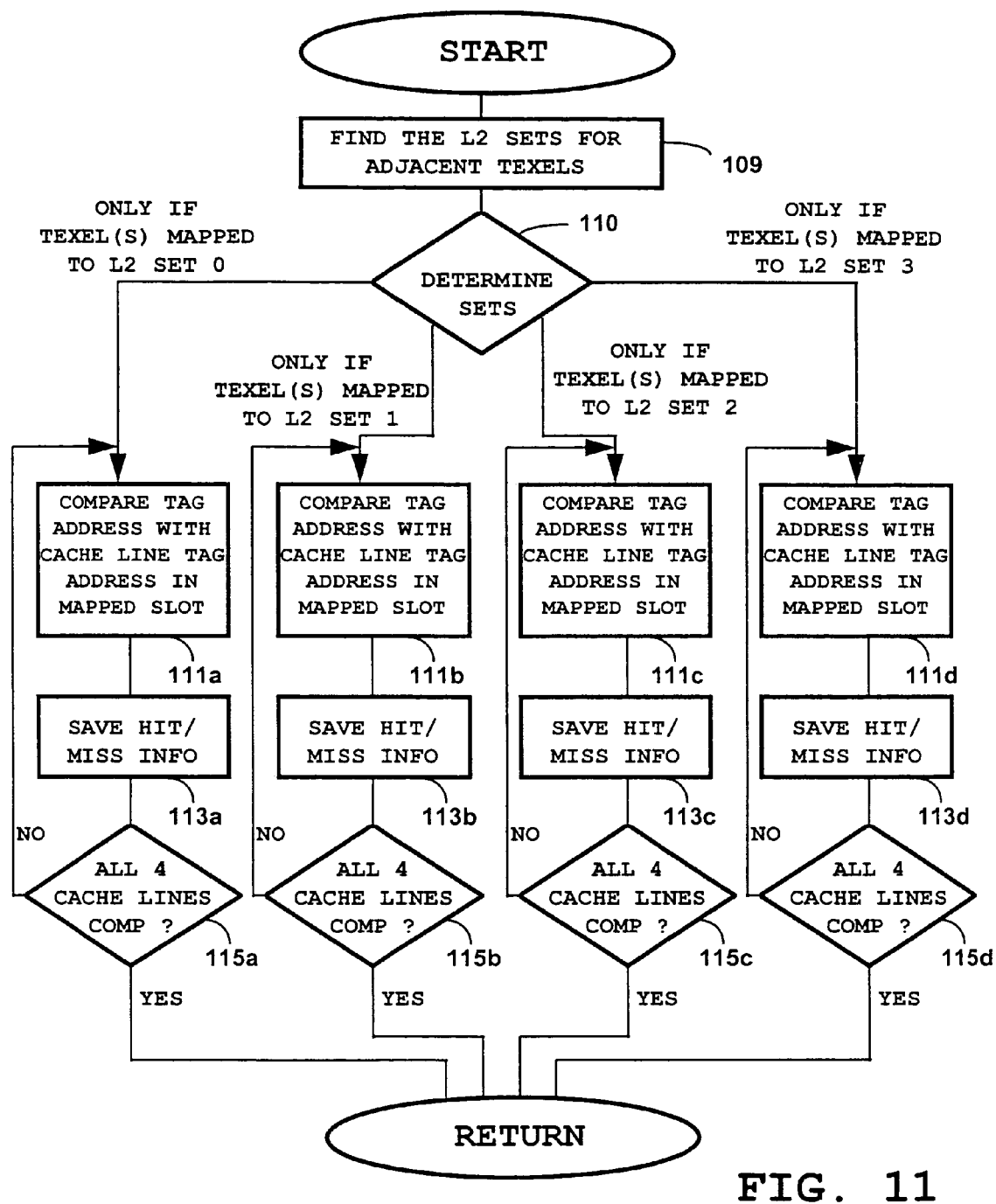
FIG. 11 is a flow diagram of a process for generating hit/miss data for L2 cache lines.

FIG. 11 is a flow diagram showing details of the step of generating hit/miss data for each of the four sets in the L2 cache. The process in step 109 locates the cache line in an L2 set to which the smallest adjacent texel, namely ($U_0'$, $V_0'$), is mapped. ($U_0'$, $V_0'$) may have been mapped to any of the four sets, $S_0$, $S_1$, $S_2$ and $S_3$. The process in step 109 further chooses three additional cache lines, one to the right, one below, and one to the right and below. Because of the layout of the cache lines in terms of UV space previously described, each of the three additional cache lines is of a different set.

In step 110 the process determines which sets actually contain data for the adjacent texels. Although data for the adjacent texels may be in four different cache lines, each of which belongs to a different set, it is possible that the data may be in one or two cache lines.

For example, FIG. 6 shows an organization of four L2 cache lines belonging to the Slot 0 of the L2 cache in one embodiment of the present invention. Each cache line contains data for 64 texels covering an 8×8 contiguous portion of UV space. Together the four cache lines cover a 16×16 contiguous portion of UV space. A top left cache line belongs to set $S_0$. A top right cache line belongs to set $S_1$. A bottom left cache line belongs to set $S_2$. A bottom right cache line belongs to set $S_3$. Referring back to FIG. 5, it can be seen that, when four adjacent texture map portions are mapped to four adjacent L2 cache lines, each texture map portion is mapped to a cache line belonging to a set different from each other. Therefore, FIG. 6 is representative of four L2 cache lines where four adjacent texture map portions are mapped to.

In FIG. 6, when texel 63 of set $S_0$, texel 56 of set $S_1$, texel 7 of set $S_2$ and texel 0 of set $S_3$, are four adjacent texels ($U_0'$, $V_0'$), ($U_0'+1$, $V_0'$), ($U_0'$, $V_0'+1$) and ($U_0'+1$, $V_0'+1$), respectively, each of four adjacent L2 cache lines contains one of the four adjacent texels. In this case, all four cache lines are used to contain the four adjacent texels.

All four texels, however, are generally contained in less than four cache lines. For example, if ($U_0'$, $V_0'$) in set $S_0$ is a texel not in the last column (texel 7, 15, 23, 31, 39, 47, 55 or 63) or the last row (texel 56, 57, 58, 59, 60, 61, 62 or 63) of set $S_0$, all four texels are in set $S_0$. If ($U_0'$, $V_0'$) is a texel in the last column of set $S_0$ but not in the last row, texels ($U_0'$, $V_0'$) and ($U_0'$, $V_0'+1$) are in set $S_0$ and texels ($U_0'+1$, $V_0'$) and ($U_0'+1$, $V_0'+1$) are in set $S_1$. If ($U_0'$, $V_0'$) is a texel in the last row of set $S_0$ but not in the last column, texels ($U_0'$, $V_0'$) and ($U_0'+1$, $V_0'$) are in set $S_0$ and texels ($U_0'$, $V_0'+1$) and texels ($U_0'+1$, $V_0'+1$) are in set $S_2$.

Therefore, all four texels are in one, two or four cache lines. When all four texels are in one or two cache lines, the remaining cache lines, thus sets including these cache lines, are left without mapping of any of the adjacent texels. In these cases, no tag address comparisons are made with the tag addresses of the cache lines of the set to which none of the adjacent texels have been mapped.

In addition, tag address comparisons are made only with cache lines of a corresponding slot to which each adjacent texel is mapped. For example, from texture map coordinates of each adjacent texel, a corresponding slot of the L2 cache to which it has been mapped is determined. A tag address of a texture map portion containing that adjacent texel is compared only against tag addresses of cache lines in the corresponding slot. If slots of the L2 cache has been allocated to two or more texture maps, a corresponding slot is determined for each adjacent texel using slot allocation information maintained in registers of the graphics processing system as well as the texture map coordinates.

The process in steps 111*a–d* compares the tag addresses of the texture map portions containing the adjacent texels with the tag addresses of the cache lines in respective sets. The result is a "hit" when the tag addresses match, i.e., a set ($S_0$, $S_1$, $S_2$, or $S_3$) in a corresponding slot of the L2 cache contains one or more of the adjacent texels. The result is a "miss" when the tag addresses don't match, i.e., a set ($S_0$, $S_1$, $S_2$, or $S_3$) in a corresponding slot of the L2 cache contains none of the adjacent texels. The process in steps 113*a–d* compiles hit/miss information for set $S_0$ to set $S_3$, respectively. If there is at least one "hit" in any set, that set is deemed to have been "hit" regardless of "misses" with respect to other cache lines in the set. The process in steps 115*a–d* continues until comparisons are performed for all four cache lines in each set of the corresponding slot.

Figure 11B:
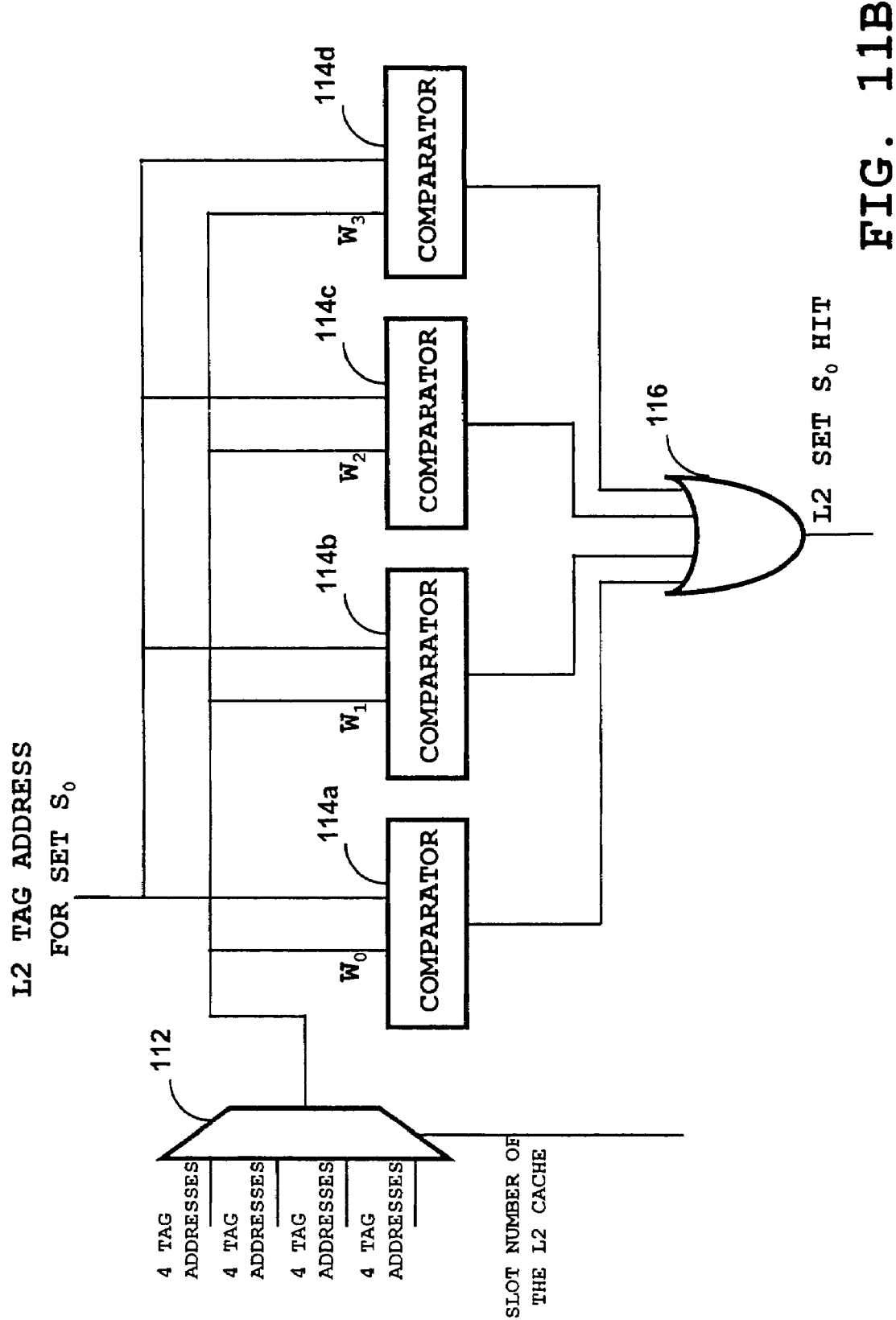
FIG. 11B is a block diagram of logic circuitry for performing the process of generating hit/miss data for set $S_0$ of the L2 cache.

FIG. 11B is a block diagram of logic circuitry for performing the process of generating hit/miss data for set $S_0$ of the L2 cache illustrated in FIG. 11. As previously mentioned, an L2 tag address of a portion of a texture map which has been assigned to set $S_0$ is compared with tag addresses of four cache lines belonging to set $S_0$ of L2 slot to which the texture map has been mapped. A multiplexor 112 is provided a slot number of the L2 cache as a selector. The multiplexor 112 is also provided tag addresses for cache lines belonging to set $S_0$ in a slot-by-slot groupings. Accordingly, the multiplexor 112 will select tag addresses for a grouping of set $S_0$.

Thus, the multiplexor 112 selects tag addresses for cache lines belonging to set $S_0$ of the slot to which the texture map has been mapped.

The tag addresses are provided to comparators 114a–d. The comparators 114a–d are also provided the L2 tag address of the texel belonging to set $S_0$. Thus, the comparators 114a–d, respectively, compare the L2 tag address of the texture map portion which has been assigned to set $S_0$ with tag addresses for each of the four L2 cache lines belonging to set $S_0$ of the slot to which the texture map has been mapped. An output of each comparator 114a–d signifies whether the L2 tag address of the texture map portion matches the tag address of the L2 cache line with which the L2 tag address was compared. If the tag addresses match, the texture map portion is stored in the L2 cache line, and "hit" is generated for the L2 cache line at the output of the corresponding comparator.

The outputs of the comparator 114a–d are coupled to inputs of a four-input OR logic 116. An output of the four-input OR login 116 forms set $S_0$ hit/mass data. Since all four of the outputs of the comparators 114a–d are OR'd together, as previously mentioned, the hit/mass data will indicate a "hit" if at least one "hit" is generated. In other words, if any L2 cache line of set $S_0$ of the slot to which the corresponding texture map portion is "hit", entire set $S_0$ of the slot is deemed to be "hit". Logical circuitry for set $S_1$, set $S_2$ and set $S_3$ are similar to the logical circuitry for set $S_0$.

Figure 12:
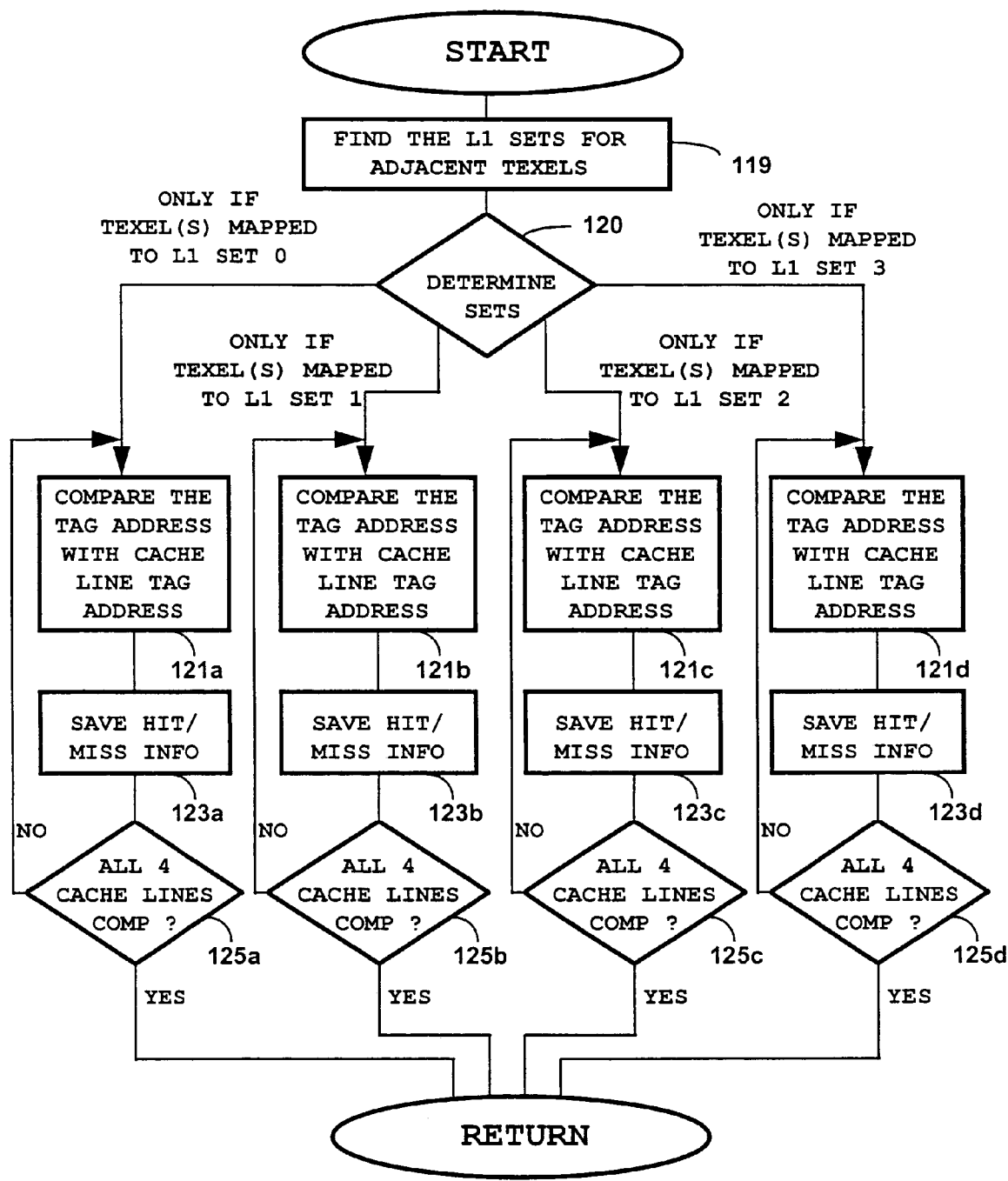
FIG. 12 is a flow diagram of a process for generating hit/miss data for L1 cache lines.

FIG. 12 is a flow diagram showing details of the step of comparing between the L1 tag addresses of the texture map portions and the tag addresses of the L1 cache lines in each of the four sets. Similar to the case of the L2 cache, the process in step 119 locates the cache line in an L1 set to which ($U_0'$, $V_0'$) is mapped. The process in step 119 further chooses three additional cache lines, one to the right, one below, and one to the right and below. In step 120 the process determines which sets actually contain data for the adjacent texels. Although data for the adjacent texels may be in four different cache lines, each of which belongs to a different set, it is possible that the data may be in one or two cache lines.

Figure 7:
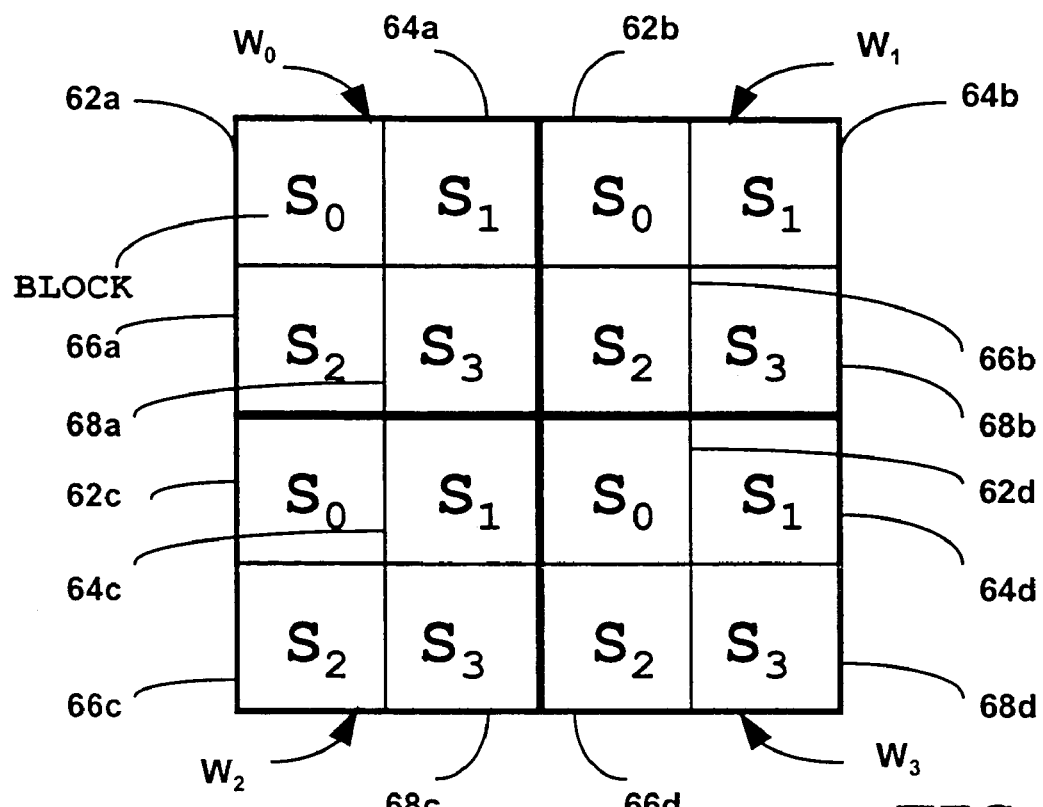
FIG. 7 illustrates an L1 cache configuration.

For example, FIG. 7 shows an organization of an embodiment of the L1 cache having 16 cache lines. For ease of description the 16 cache lines are indicated in FIG. 7 by squares, with the squares arranged to form a larger square, with the larger square having sides of four cache lines each. Thus, each of 16 squares 62a–d, 64a–d, 66a–d and 68a–d is an L1 cache line. Further, the L1 cache lines are organized into four sets $S_0$, $S_1$, $S_2$ and $S_3$. The cache lines 62a–d belong to set 0, the cache lines 64a–d belong to set 1, the cache lines 66a–d belong to set 2 and cache lines 68a–d belong to set 3. Thus, each set includes four cache lines. It is seen from FIG. 7 that each cache line of any four adjacent cache lines belongs to a set different from each other. For example, for four adjacent cache lines 62a, 64a, 66a and 68a, 62a belongs to set $S_0$, 64a belongs to set $S_1$, 66a belongs to set $S_2$ and 68a belongs to set $S_3$.

Thus, each of any four adjacent L1 cache lines selected belongs to a set different from each other, similar to the four adjacent L2 cache lines. Similar to the previously mentioned case of the L2 cache, there is no guarantee that any particular set will contain a cache line mapped to a texture map portion containing one of the four adjacent texels since multiple texels may be from a texture map portion mapped to one cache line, and thus from the same set. In these cases, no tag address comparisons are made with the tag addresses of the cache lines of the set to which none of the adjacent texels have been mapped.

Steps 121a–d, 123a–d and 125a–d are similar to steps 111a–d, 113a–d and 115a–d in FIG. 11. The result is a "neither hit nor miss" for a set of the L1 cache if coordinates of none of the adjacent texels are mapped to that set ($S_0$, $S_1$, $S_2$, or $S_3$).

Figure 13:
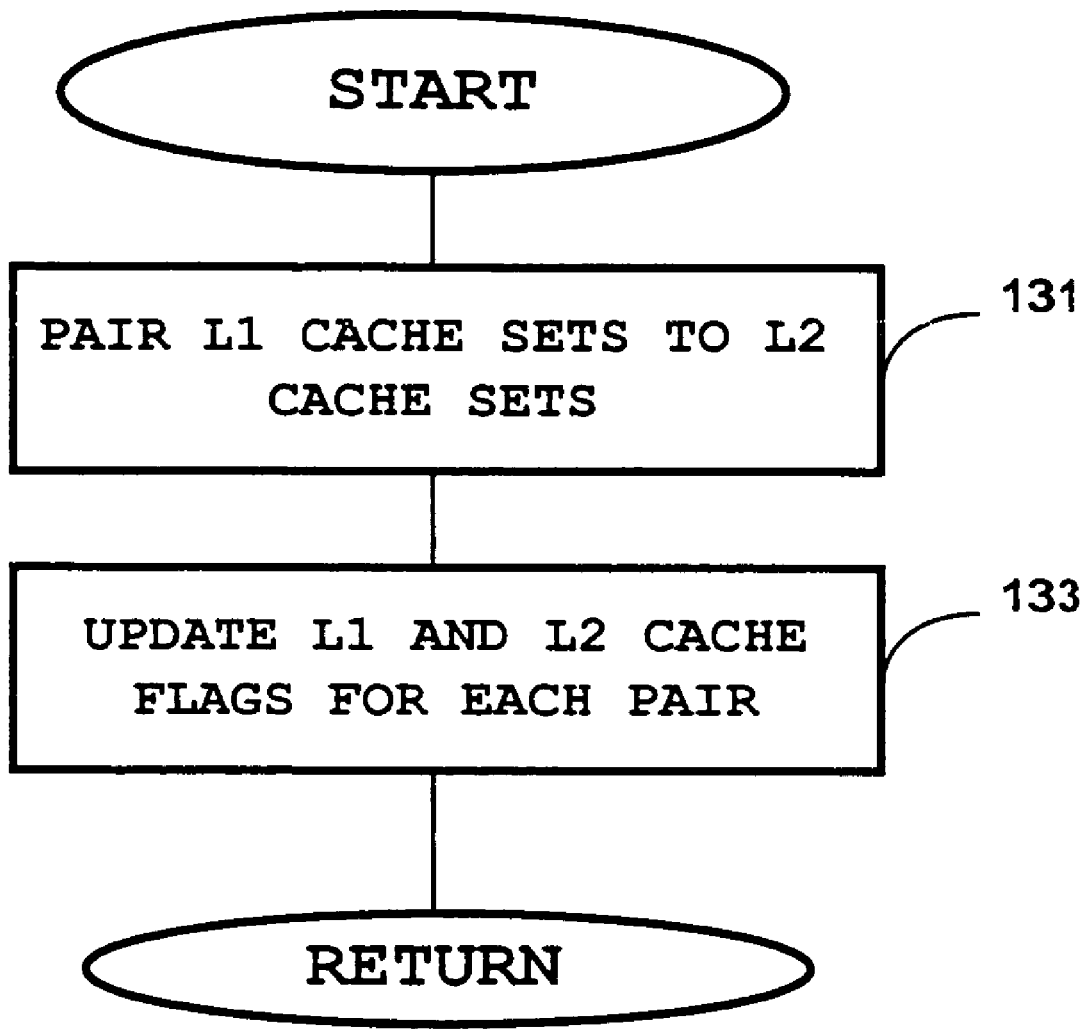
FIG. 13 is a flow diagram of L2/L1 cache line pair flag updates.

The "hit/miss" data generated in FIG. 11 and FIG. 12 are used to pair up the L1 and L2 sets and to update L1 and L2 cache flags on a pair by pair basis. FIG. 13 is a flow diagram showing details of updating L1 and L2 cache flags. The process in step 131 pairs up L1 cache sets to L2 cache sets. In case of a "hit" in the L1 set, the L1 set is paired up with the L2 set from which the content of the L1 cache line that was "hit" came. As previously mentioned, the Slot ID term in each L1 tag address is used to identify the slot of the L2 cache which is allocated to the texture map containing the texture data in the L1 cache line. Similarly, in case of a "miss" in the L1 set, the L1 set is paired with the L2 set which is allocated to a texture map portion containing the texel which was "missed" in the L1 set. In case of the "neither hit nor miss" condition in the L1 set, the L1 set is not paired with any L2 set. Any pairing is irrelevant because no flags are updated for either the L1 cache or the L2 cache.

A single L2 set may be paired with more than one L1 sets. For example, an L2 cache line can contain up to 256 texels while number of texels in an L1 cache line is fixed to 16 for this embodiment of the present invention. If an L2 cache line containing 256 texels is transferred to the L1 cache, all 16 cache lines of the L1 cache are used to store all of 256 texels. In this case, if all four adjacent texels are mapped to a single L2 cache line and each of the adjacent texels is mapped to a different L1 cache line, all of the L1 sets would be paired up with an identical L2 set.

Figure 14:
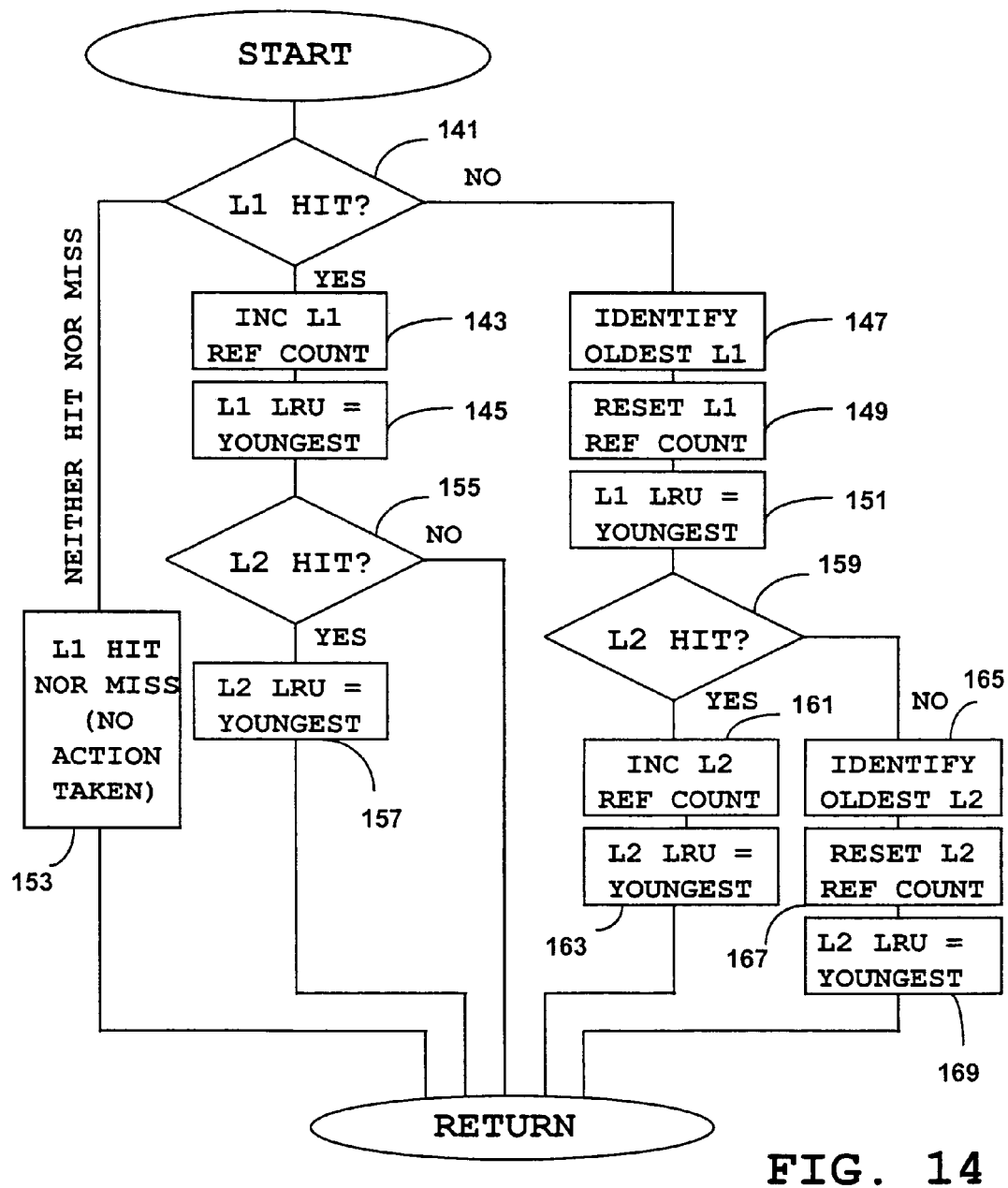
FIG. 14 is a detailed flow diagram of a process performing flag updates for one L2/L1 cache line pair.

Once the pairing has been completed, the process in step 133 updates L1 and L2 cache flags for each pair. FIG. 14 is a flow diagram showing details of updating the flags of the L1 and L2 cache lines in each pair of L1 and L2 sets. The flags to be updated by the process include age statuses which are tracked by a stack-like architecture associated with each set. Understanding of process of updating the age statuses perhaps would be enhanced with an understanding of an organization of the L2 cache and mapping of a texture map to the L2 cache.

Referring back to FIG. 5, although FIG. 5 shows the cache lines of the L2 cache in a single plane, the four quadrants may also be viewed as being organized into a stack-like architecture. In the stack-like architecture each of the quadrants represent one or four ways $W_0$, $W_1$, $W_2$ or $W_3$, and the ways are stacked four deep. The order of the stacking in each set of each slot depends on an age status of each cache line. In other words, the cache line that is most recently used for a data transfer becomes "youngest" (i.e., goes to the bottom of the stack in the corresponding set of the corresponding slot). In the set, the least recently used (i.e., "oldest") cache line at the top of the stack is used to store the texture map portion. That way, the least recently used data in the set of the slot is always overwritten first.

Two other flags tracked for each of the L2 cache lines is an L2 reference counter and an L2 internal counter. The L2 internal counters are tracked by another process (not shown). The L2 reference counter tracks the number of times a content of an associated L2 cache line is requested, i.e., if a data transfer is requested from an L2 cache line to an L1 cache line, a respective L2 reference counter would be incremented by 1. The L2 internal counter tracks the number of times a content of an associated L2 cache line is transferred.

Prior to overwriting an L2 cache line, the L2 reference counter and the L2 internal counter are compared. If the L2 reference counter contains a higher value, there is data in the L2 cache line which have been requested but not yet transferred. In that case, the overwriting process is stopped until the L2 internal counter matches the L2 reference counter, i.e., the requested data is in fact transferred. This ensures that an L2 cache line is not overwritten with new data before the old data is transferred to the L1 cache.

Thus, the L2 age statuses are used to select cache lines that are "oldest" in their respective set to be overwritten. In addition, the L2 reference counters and the L2 internal counters ensure that data in selected L2 cache lines which have been requested but not yet transferred to the L1 cache are not overwritten.

Similar to the L2 cache lines, an L1 age status, an L1 reference counter and an L1 internal counter are tracked for each of the L1 cache lines. The L1 age statuses are used to select cache lines that are "oldest" in their respective set to be overwritten. Similar to the L2 cache, once the texture map is mapped to a slot of the L2 cache, the sets of the L1 cache used to load a particular texture map portion is pre-defined with reference to the L2 slot ID included in L1 tag addresses.

Within each set, the cache Lines are organized into four ways, $W_0$, $W_1$, $W_2$ or $W_3$. Referring back to FIG. 7, although FIG. 7 shows all the cache lines of the L1 cache in a single plane, the ways in each set are organized in a stack-like architecture. The cache lines 62a, 64a, 66a and 68a of set $S_0$, respectively, belongs to one of the ways $W_0$, $W_1$, $W_2$ or $W_3$. The order of the cache lines 62a, 64a, 66a and 68a depends on an age status of each cache line. In other words, the cache line that is most recently used for a data transfer becomes "youngest" (i.e., goes to the bottom of the stack). When new data is transferred into set $S_0$, the least recently used (i.e., "oldest") cache line at the top of the stack is used to store the new data. That way, the least recently used data is always overwritten first. Similarly, the cache lines 62b, 64b, 66b and 68b of set $S_1$, the cache lines 62c, 64c, 66c and 68c of set $S_2$, and the cache lines 62d, 64d, 66d and 68d are organized into a stack-like architecture in their respective set.

Similar to the L2 cache, the L1 internal counters are tracked by another process. The L1 reference counters and the L1 internal counters ensure that data in selected L1 cache lines which have been requested but not yet transferred to the engine are not overwritten.

The process in step 141 chooses one of three alternate sets of tasks based on whether the result of comparisons for a set of the L1 cache is "hit," "miss" or "neither hit nor miss". As discussed earlier, multiple texels may be mapped to one set of the L1 cache and, therefore, it is possible that one or more sets of the L1 cache do not have any of the texels mapped to them. For such L1 sets, the process in step 153 generates "neither hit nor miss" condition and takes no action to update any of the flags.

If a set of the L1 cache has been "hit," the process in step 143 increments a corresponding L1 reference counter by 1 to reflect that a transfer is pending. In addition, the process in step 145 updates the age status of the L1 cache line that contains one or more of the adjacent texels to become "youngest", i.e., the L1 cache line is placed at the bottom of the stack of the set. The process in step 155 then chooses one of two alternate sets of tasks based on whether the paired set of the L2 cache is "hit" as well. If a corresponding L2 set has been "hit," the process in step 157 updates the age status of the L2 cache line that was "hit" to become "youngest". If the paired L2 set has not been hit, flags of the L2 cache are not updated since no transfer out of the L2 cache is pending and the least recently used cache line status doesn't change.

If a set of the L1 cache has not been "hit", the process in step 147 selects an "oldest" L1 cache line of the set to receive texture data based on the age statuses. The process in step 149 resets the L1 reference counter of the selected L1 cache line to 1 to indicate that there is a transfer pending out of that L1 cache line. Then, the process in step 151 updates the age status of that L1 cache line to become "youngest" to indicate that this cache line is the last one of the set to have been used.

Then the process in step 159 chooses one of two alternate sets of tasks based on whether the corresponding set of the L2 cache has been "hit." When the set of the L1 cache has not been "hit," if a set of the L2 cache which has been paired to the L1 set has been "hit," the process updates the L2 flags as follows. The process in step 161 increments the L2 reference counter of the L2 cache line that was "hit" by 1 to indicate that a transfer is pending. Then the process updates the age status of the L2 cache line to become "youngest" to indicate that this L2 cache line will be the last L2 cache line in the set to have been used.

If the set of the L2 cache has been "missed," the process in step 165 selects the "oldest" L2 cache line of the set to receive transfer of texture data. Then the process in step 167 resets the reference counter of the selected L2 cache line to 1 to indicate that a requested data transfer is pending out of that L2 cache line. The process in step 169 updates the age status of that L2 cache line to become "youngest" to indicate that this L2 cache line will be the last L2 cache line in the set to have been used.

Thus, as previously mentioned, L1 and L2 cache flags coordinate synchronization between the L1 cache and the L2 cache. In other words, the L1 and L2 cache flags indicate which L1 and L2 cache lines are used to receive transferred data and when these L1 and L2 cache lines are available. Table 1 below is a compilation of how the L1 and L2 reference counters and age statuses are updated in response to hit and miss conditions.

TABLE 1

| L1 | L2 | L1 Reference Counter | L2 Reference Counter | L1 Age Status | L2 Age Status |
|---|---|---|---|---|---|
| Hit | Hit | Increment by 1 | None | Becomes "Youngest" | Becomes "Youngest" |
| Hit | Miss | Increment by 1 | None | Becomes "Youngest" | None |
| Miss | Hit | Reset to 1 | Increment by 1 | Becomes "Youngest" | Becomes "Youngest" |
| Miss | Miss | Reset to 1 | Reset to 1 | Becomes "Youngest" | Becomes "Youngest" |
| Neither Hit nor Miss | Don't Care | None | None | None | None |

Figure 15:
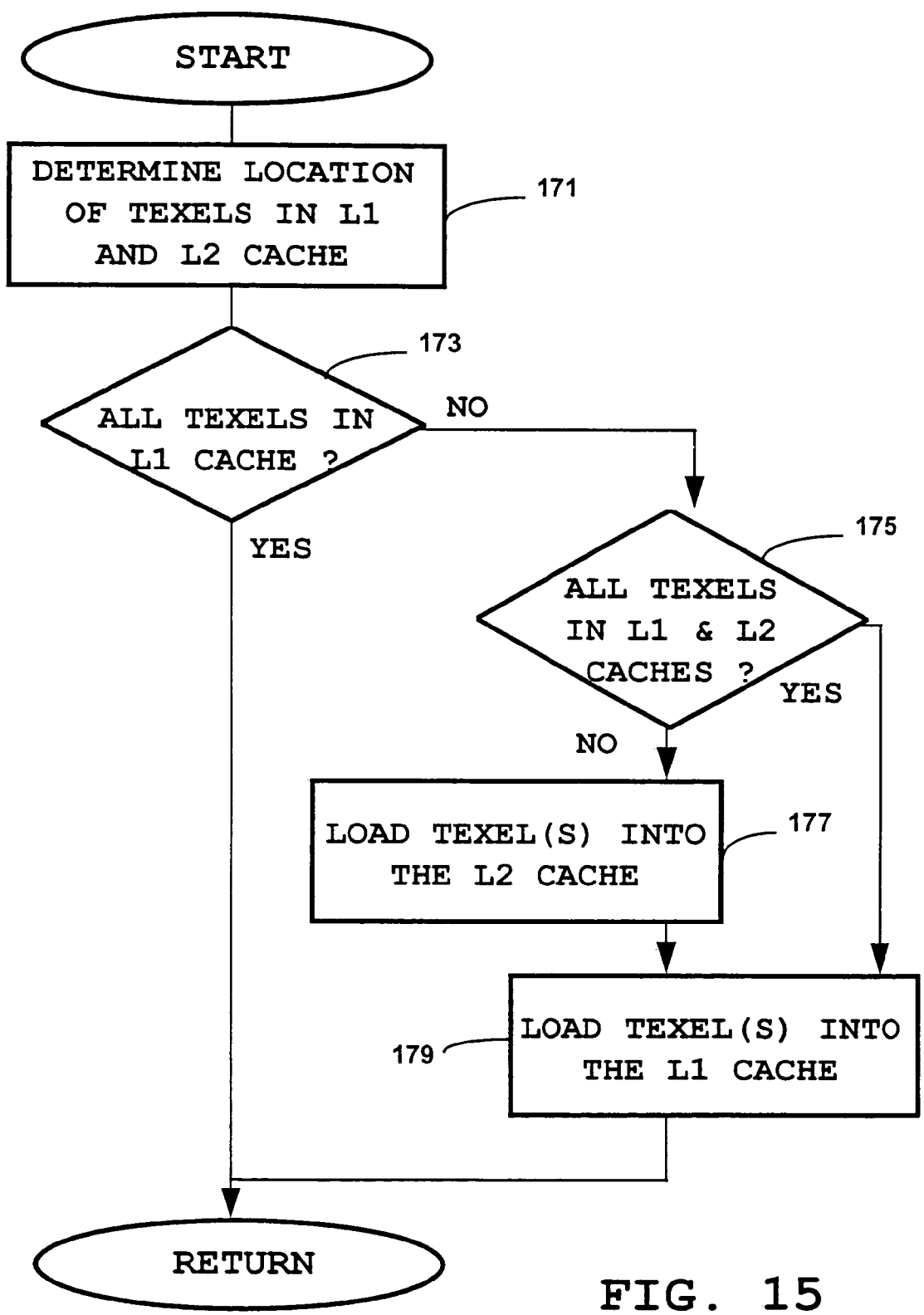
FIG. 15 is a flow diagram of a process for locating and loading texel data into a graphics cache.

Once the L1 and L2 cache flags for each pair of L1 and L2 sets are updated, the process of FIG. 3 in step 47 determines location of texels for L1 and L2 caches, and loads the texels that are not found into the L1 and the L2 caches. FIG. 15 is a flow diagram showing details of locating and loading texture data.

The process in step 171 determines the precise locations of the texels in the L1 and L2 caches. Since the tag addresses show where in the L1 and L2 caches the texture map portions are, it is a matter of finding UV-coordinates of the texels in the cache lines that contain the texture map portions.

The process in step 173 searches in the L1 cache to find all adjacent texels. If all adjacent texels are in the L1 cache, no further transfers into or within the graphics cache are needed. Only texture data transfers to be made are from the L1 cache to the engine if all adjacent texels are in the L1 cache. If not all adjacent texels are in the L1 cache, then the process in step 175 determines whether all texels are in the L1 and L2 caches. If all adjacent texels are in either the L1 cache or the L2 cache, the process in step 179 transfers L2 cache lines containing the adjacent texels that are not present in the L1 cache into the L1 cache. When the texture data are transferred from an L2 cache line to the L1 cache, the L2 cache line internal counter is incremented by 1 to indicate that a pending data transfer has been completed.

If not all adjacent texels are found in either the L1 cache or the L2 cache, the process in step 177 transfers texture map portions that contain missing adjacent texels to a slot allocated to the texture map containing the missing adjacent texels. A transfer of data into the L2 cache may be from the system memory or, if the requested data has already been transferred into the frame buffer from the system memory over the system interface, from the frame buffer. During the transfer of texture map portions into the L2 cache, the texture map portions are transferred to the "oldest" L2 cache line of each corresponding set ($S_0$, $S_1$, $S_2$ or $S_3$) of the slot allocated to the texture map. Then the process in step 179 transfers texels to the L1 cache, and the corresponding L2 cache line internal counter is incremented by 1.

Once the texels are in the L1 cache, the process of FIG. 2 in step 39 transfers the texels from the L1 cache to the engine. Once the texels are transferred from any L1 cache line, the corresponding L1 cache line internal counter is updated by 1 to indicate that a pending data transfer has been completed.

In another embodiment of the present invention, the pixel stream includes pixel coordinates for two pixels $P_0$ and $P_1$. $P_0$ and $P_1$ have corresponding texture map coordinates $U_0$, $V_0$ and $U_1$, $V_1$, respectively. In this embodiment, in addition to finding four adjacent texels to $U_0$, $V_0$, ($U_0'$, $V_0'$), ($U_0'+1$, $V_0'$), ($U_0'$, $V_0'+1$) and ($U_0'+1$, $V_0'+1$), four adjacent texels to $U_1$, $V_1$, ($U_1'$, $V_1'$), ($U_1'+1$, $V_1'$), ($U_1'$, $V_1'+1$) and ($U_1'+1$, $V_1'+1$) are located. A texel ($U_s$, $V_s$) in this embodiment denotes the texel closet to the origin of all eight texels and is either ($U_0'$, $V_0'$) or ($U_1'$, $V_1'$) depending on their relative locations.

The front end processor, in the embodiment described, ensures that UV coordinates corresponding to $P_0$ and $P_1$ are within four texels of each other. In other words, ABS ($U_0-U_1$)<4 and ABS ($V_0-V_1$)<4. The use of pixels within four texels in UV space of each other is perhaps best explained with reference to FIGS. 7 and 8 which show a structure of one embodiment of the L1 cache.

Figure 8:
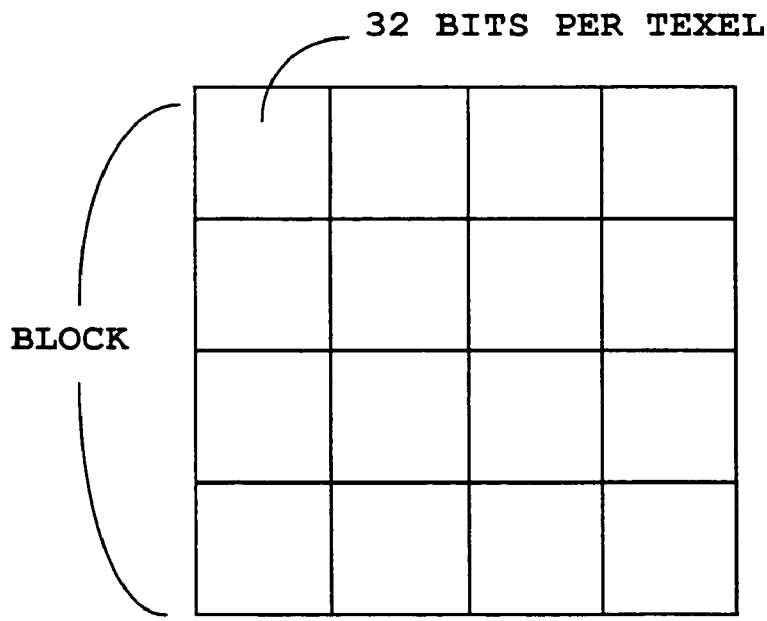
FIG. 8 illustrates details of a cache line of the L1 cache of FIG. 7.

FIG. 8 is a 4×4 mapping of an L1 cache line which contains 16 texels, each of which is 32 bits in one embodiment of the present invention. The size of an L1 cache line is 512 bits in this embodiment. As shown in FIG. 8, each L1 cache line contains only 16 texels in a 4×4 block. As previously mentioned, the cache lines in each set are organized into a stack. Only one of the cache lines in each stack (set) is accessed during processing of a pixel stream. If the distance between $U_0$ and $U_1$ or $V_0$ and $V_1$ is greater than or equal to 4, it is possible for two or more of the texels adjacent to ($U_0$, $V_0$) or ($U_1$, $V_1$) to be in two different L1 cache lines of the same L1 set. Therefore, restricting the distance in UV space between pixels $P_0$ and $P_1$ ensures that all texels used for processing are available.

With the distance in UV space between $P_0$ and $P_1$ less than four texels, all eight texels adjacent to ($U_0$, $V_0$) and ($U_1$, $V_1$), respectively, can be mapped to four adjacent L2 cache lines, if the smallest L2 cache line has 32 texels in 8×4 arrangement and the L1 cache lines have 16 texels in 4×4 arrangement. In other words, if all eight texels fit in four L1 cache lines containing contiguous texture map portions, they can just as easily fit in the same number of L2 cache lines which are bigger than the L1 cache lines.

In another embodiment of the present invention, texels from two different texture maps $t_a$ and $t_b$ are used during processing of a pixel stream having one or two pixels. Each pixel may require blending in of texels from either or both of the texture maps $t_a$ and $t_b$. The steps of receiving pixel coordinates, obtaining texture map coordinates, determining adjacent texels, obtaining the adjacent texels, and transferring the texels to the engine are similar to the corresponding steps in an embodiment where only one texture map is used, and are performed for each of the texture maps $t_a$ and $t_b$. In the engine, the texels from both texture maps, as required, are blended together to generate each pixel.

The L1 and L2 caches of FIGS. 4–8 represent one embodiment of the present invention. Details such as cache sizes, number of bits in each cache line, number of bits in each texel, etc. are given as an example and not intended to limit the scope of the present invention. For example, although the L2 cache in FIGS. 4–6 is partitioned into four slots of identical size in this embodiment, a number of slots may be more or less than four and slot sizes may vary.

Accordingly, the present invention provides a synchronized two-level graphics processing cache for improving performance of a graphics processing system. Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the appended claims and their equivalents rather than the foregoing description.

What is claimed is:

1. A method of performing graphics processing using a first cache comprised of first cache lines and a second cache comprised of second cache lines, each of the first cache lines being associated with first cache flags, and each of the second cache lines being associated with second cache flags, the method comprising:
   checking for availability of graphics data in the first cache;
   checking for availability of graphics data in the second cache;
   updating the first cache flags based on availability of the graphics data in the first and second caches; and
   updating the second cache flags based on availability of the graphics data in the second cache.

2. The method of claim 1 further comprising determining whether any requested data in an oldest cache line is transferred prior to overwriting the oldest cache line.

3. The method of claim 2 wherein the determining comprises comparing counters of the cache flags of the oldest cache line.

4. The method of claim 1 wherein the first cache flags comprise a plurality of first reference counters, each of the plurality of first reference counters associated with, and tracking a number of transfers requested from, a respective one of the first cache lines.

5. The method of claim 1 wherein the first cache lines are divided into a plurality of first sets.

6. The method of claim 5 wherein the first cache flags comprise a plurality of first age status stacks, each of the plurality of first status stacks associated with, and tracking first age statuses of, the first cache lines in a respective one of the plurality of first sets.

7. The method of claim 1 wherein the second cache flags comprise a plurality of second reference counters, each of the plurality of second reference counters associated with, and tracking a number of transfers requested from, a respective one of the second cache lines.

8. The method of claim 1 wherein the second cache lines are divided into a plurality of second sets.

9. The method of claim 8 wherein the second cache flags comprises a plurality of second age status stacks, each of the plurality of second age status stacks associated with, and tracking second age statuses of, second cache lines in a respective one of the plurality of second sets.

10. The method of claim 8 wherein checking for availability of the graphics data in the second cache comprises:
receiving coordinates of a texel associated with one of the plurality of second sets;
ascertaining a second tag address of the texel, the second tag address represented in terms of the received coordinates of the texel;
comparing the second tag address with second cache tag addresses of the second cache lines belonging to the associated second set, the second cache tag addresses represented in terms of coordinates of texels contained in the second cache;
returning a second graphics data available status when the second tag address matches a second cache tag address of the second cache lines belonging to the associated second set; and
returning a second graphics data not available status when the second tag address matches no second cache tag addresses of the second cache lines belonging to the associated second set.

11. The method of claim 10 wherein updating second cache flags comprises incrementing a second reference counter for tracking a number of transfers requested from a second cache line whose second cache tag address matches the second tag address and updating a second age status of the second cache line to youngest, when the second graphics data available status has been returned.

12. The method of claim 10 wherein updating second cache flags comprises identifying an oldest second cache line belonging to the associated one of the second sets, resetting a second reference counter for tracking a number of transfers requested from the oldest second cache line and updating a second age status of the oldest second cache line to youngest, when the second graphics data not available status has been returned.

13. The method of claim 5 wherein checking for availability of graphics data in the first cache comprises:
receiving coordinates of a texel associated with one of the plurality of first sets;
ascertaining a first tag address of the texel, the first tag address represented in terms of the received coordinates of the texel;
comparing the first tag address with first cache tag addresses of the first cache lines belonging to the associated set, the first cache tag addresses represented in terms of coordinates of texels contained in the first cache;
returning a first graphics data available status when the first tag address matches any one of the first cache tag addresses of the first cache lines belonging to the associated set; and
returning a first graphics data not available status when the first tag address matches none of the first cache tag addresses of the first cache lines belonging to the associated set.

14. The method of claim 13 wherein updating first cache flags comprises updating a first age status of a first cache line, whose first cache tag address matches the first tag address, to youngest, when the first graphics data available status and the second graphics data available status have been returned.

15. The method of claim 13 wherein updating first cache flags comprises incrementing a first reference counter for tracking a number of transfers requested from a first cache line whose first cache tag address matches the first tag address and updating a first age status of the first cache line to youngest, when the second graphics data not available status and the first graphics data available status have been returned.

16. The method of claim 13 wherein updating first cache flags comprises identifying an oldest first cache line belonging to the associated one of the first sets, resetting a first reference counter for tracking a number of transfers requested from the oldest first cache line and updating a first age status of the oldest first cache line to youngest, when the second graphics data not available status and the first graphics data not available status have been returned.

17. A synchronized two level cache system in a graphics processor generating display information based on graphics data for an area, comprising:
a first cache comprising first cache lines containing graphics data;
a second cache comprising second cache lines containing graphics data; and
counters associated with the first and second cache lines, wherein the counters are compared to ensure that requested data in a least recently used cache line is transferred prior to overwriting the least recently used cache line.

18. The system of claim 17 further comprising age indicators for indicating a history of use of the graphics data for each cache line.

19. The system of claim 18 wherein the age indicators indicate the cache line least recently used in the first cache and the second cache.

20. The system of claim 17 wherein the counters indicate whether a transfer is pending for each cache line.

* * * * *